(12) United States Patent
Stewart et al.

(10) Patent No.: US 7,288,586 B2
(45) Date of Patent: Oct. 30, 2007

(54) POLYESTER BASED COBALT CONCENTRATES FOR OXYGEN SCAVENGING COMPOSITIONS

(75) Inventors: Mark Edward Stewart, Kingsport, TN (US); Emerson Eston Sharpe, Jr., Kingsport, TN (US); Benjamin Bradford Gamble, Kingsport, TN (US); Steven Lee Stafford, Gray, TN (US); Robert Noah Estep, Kingsport, TN (US); James Carl Williams, Blountville, TN (US); Thomas Roger Clark, Jonesborough, TN (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

(21) Appl. No.: 11/292,441

(22) Filed: Dec. 2, 2005

(65) Prior Publication Data
US 2006/0128861 A1  Jun. 15, 2006

Related U.S. Application Data

(60) Provisional application No. 60/633,524, filed on Dec. 6, 2004.

(51) Int. Cl.
C08G 63/60 (2006.01)
C08G 63/56 (2006.01)
C08K 5/09 (2006.01)
C07C 69/65 (2006.01)
C07C 69/63 (2006.01)

(52) U.S. Cl. .......... 524/398; 524/301; 524/306; 524/307; 524/315; 524/440; 524/605; 525/211; 525/425; 525/432; 428/35.7; 428/36.7

(58) Field of Classification Search .......... 524/398
See application file for complete search history.

(56) References Cited

U.S. PATENT DOCUMENTS 3,686,069 A * 8/1972 Winkler et al. .......... 428/475.2

(Continued)

FOREIGN PATENT DOCUMENTS

BR  9604228  5/1998

(Continued)

OTHER PUBLICATIONS

Office Action dated Oct. 13, 2006, for related U.S. Appl. No. 11/294,249, filed Dec. 5, 2005.

(Continued)

*Primary Examiner*—Joseph D. Anthony
(74) *Attorney, Agent, or Firm*—Bernard J. Graves, Jr.; Jennifer R. Knight

(57) ABSTRACT

A solid concentrate is provided having a combination of a transition metal present in an amount ranging from 1000 to 40,000 ppm (weight by metal) and a polyester polymer present in an amount of at least 40 wt. % based on the weight of the concentrate. Concentrates made with highly modified polyester polymers are easy to compound with transition metals forming less brittle polymer upon melt extrusion. Bottle preforms and oxygen scavenging bottles can be made from these concentrates by combining solid polyester particles, solid polyamide particles, and solid these concentrate particles c into an melt processing zone, forming a melt, and forming an article directly from the melt. The b* color and the L* color and the haze levels of the preforms are improved over the preforms made with liquid carriers instead of solid concentrates. The particles are also advantageously simultaneously dried in a drying zone under conditions effective to at least partially remove moisture from the blend to thereby further improve the b* color and L* color.

60 Claims, 10 Drawing Sheets

U.S. PATENT DOCUMENTS

| | | | |
|---|---|---|---|
| 4,376,194 A * | 3/1983 | Tanaka et al. | 528/288 |
| 4,501,781 A | 2/1985 | Kushida et al. | |
| 4,536,409 A | 8/1985 | Farrell et al. | |
| 5,021,515 A | 6/1991 | Cochran et al. | |
| 5,034,252 A | 7/1991 | Nilsson et al. | |
| 5,049,624 A | 9/1991 | Adams et al. | |
| 5,075,362 A | 12/1991 | Hofeldt et al. | |
| 5,137,790 A | 8/1992 | Cox et al. | |
| 5,159,005 A | 10/1992 | Frandsen et al. | |
| 5,194,478 A | 3/1993 | Frandsen et al. | |
| 5,211,875 A | 5/1993 | Speer et al. | |
| 5,239,016 A | 8/1993 | Cochran et al. | |
| 5,258,233 A | 11/1993 | Mills et al. | |
| 5,266,233 A | 11/1993 | Houghton et al. | |
| 5,266,413 A | 11/1993 | Mills et al. | |
| 5,281,360 A | 1/1994 | Hong et al. | |
| 5,302,430 A | 4/1994 | Ardechir et al. | |
| 5,314,987 A | 5/1994 | Kim et al. | |
| 5,340,884 A | 8/1994 | Mills et al. | |
| 5,346,644 A | 9/1994 | Speer et al. | |
| 5,639,815 A | 6/1997 | Cochran et al. | |
| 5,641,825 A * | 6/1997 | Bacskai et al. | 524/398 |
| 5,834,079 A | 11/1998 | Blinka et al. | |
| 5,866,005 A | 2/1999 | DeSimone et al. | |
| 5,866,649 A * | 2/1999 | Hong et al. | 524/538 |
| 5,889,093 A | 3/1999 | Hatakeyama et al. | |
| 5,955,527 A | 9/1999 | Cochran et al. | |
| 6,083,585 A | 7/2000 | Cahill et al. | |
| 6,239,210 B1 | 5/2001 | Kim et al. | |
| 6,239,233 B1 * | 5/2001 | Bell et al. | 525/425 |
| 6,248,258 B1 | 6/2001 | Tomita et al. | |
| 6,254,803 B1 | 7/2001 | Matthews et al. | |
| 6,254,804 B1 | 7/2001 | Matthews et al. | |
| 6,288,161 B1 | 9/2001 | Kim et al. | |
| 6,319,575 B1 * | 11/2001 | Takashima et al. | 428/35.7 |
| 6,346,307 B1 | 2/2002 | Al Ghatta et al. | |
| 6,417,262 B1 | 7/2002 | Turner et al. | |
| 6,423,396 B2 | 7/2002 | Hashimoto | |
| 6,444,283 B1 * | 9/2002 | Turner et al. | 428/35.7 |
| 6,455,620 B1 | 9/2002 | Cyr et al. | |
| 6,544,611 B2 | 4/2003 | Schiraldi et al. | |
| 6,689,437 B1 | 2/2004 | Ubara et al. | |
| 6,777,479 B1 * | 8/2004 | Bernard et al. | 524/445 |
| 6,790,499 B2 | 9/2004 | Andrews et al. | |
| 6,793,994 B2 | 9/2004 | Tsai et al. | |
| 6,933,055 B2 | 8/2005 | Share et al. | |
| 2002/0002238 A1 | 1/2002 | Laplante et al. | |
| 2002/0002251 A1 | 1/2002 | Ghatta et al. | |
| 2002/0028862 A1 | 3/2002 | Johnson et al. | |
| 2002/0063238 A1 | 5/2002 | Cochran et al. | |
| 2002/0124988 A1 | 9/2002 | Takizawa et al. | |
| 2003/0012896 A1 | 1/2003 | Ching et al. | |
| 2003/0027912 A1 | 2/2003 | Tung et al. | |
| 2003/0039779 A1 | 2/2003 | Share et al. | |
| 2003/0083191 A1 | 5/2003 | Nakajima et al. | |
| 2003/0108702 A1 | 6/2003 | Tung et al. | |
| 2003/0134966 A1 | 7/2003 | Kim et al. | |
| 2003/0232057 A1 | 12/2003 | Turini et al. | |
| 2004/0005288 A1 | 1/2004 | Lin | |
| 2004/0068055 A1 | 4/2004 | Share et al. | |
| 2004/0074904 A1 | 4/2004 | Share et al. | |
| 2004/0241468 A1 | 12/2004 | Otaki | |
| 2005/0106343 A1 | 5/2005 | Kim et al. | |
| 2006/0052504 A1 * | 3/2006 | Xia et al. | 524/440 |
| 2006/0105129 A1 * | 5/2006 | Xia | 428/35.7 |
| 2006/0106146 A1 * | 5/2006 | Xia et al. | 524/413 |
| 2006/0106192 A1 * | 5/2006 | Xia | 528/298 |
| 2006/0110557 A1 * | 5/2006 | Xia et al. | 428/35.7 |
| 2006/0122306 A1 * | 6/2006 | Stafford et al. | 524/440 |
| 2006/0148957 A1 * | 7/2006 | Stewart et al. | 524/440 |

FOREIGN PATENT DOCUMENTS

| | | |
|---|---|---|
| BR | 9604229 | 5/1998 |
| BR | 9604230 | 5/1998 |
| DE | 10123081 | 11/2002 |
| EP | 0 546 546 | 6/1993 |
| EP | 1655238 | 5/2006 |
| JP | 3193325 | 8/1991 |
| JP | 10007893 | 1/1998 |
| JP | 2000273328 | 10/2000 |
| JP | 2001097342 | 4/2001 |
| JP | 2001179090 | 7/2001 |
| JP | 2001252559 | 9/2001 |
| JP | 2002205721 | 7/2002 |
| JP | 2002302124 | 10/2002 |
| WO | WO97/28218 | 8/1997 |
| WO | WO99/20673 | 4/1999 |
| WO | WO 01/10945 | 2/2001 |
| WO | WO 01/90238 | 11/2001 |
| WO | WO 02/072335 | 9/2002 |
| WO | WO 02/072350 | 9/2002 |
| WO | WO 2005/023530 | 3/2005 |
| WO | WO 2005/0106343 | 5/2005 |

OTHER PUBLICATIONS

Notification of Transmittal of the International Search Report and the Written Opinion of the International Searching Authority, or the Declaration, date of mailing Oct. 5, 2006, for a corresponding PCT application.

Co-pending U.S. Appl. No. 60/633,520, filed Dec. 6, 2004.

Co-pending U.S. Appl. No. 60/633,524, filed Dec. 6, 2004.

Slade, Jr., Philip E., Polymer Molecular Weights, 1975, pp. 31-39, Marcel Dekker, Inc., New York, New York.

DeRoover, Coppens, Devaux, Legras, Momtaz, Contribution to Poly(m-xylylene adipamide) Characterization: Hydrolysis, Condensation, and Oxidation in the Melt, 1996, pp. 1039-1047, John Wiley & Sons, Inc., New York.

Prattipati et al., Journal of Applied Polymer Science, 2005, 97, 1361-1370.

Billmeyer, Jr., Principles of Color Technology, 1981, pp. 25-66.

Co-pending U.S. Appl. No. 11/005,288 filed Dec. 6, 2004, Publication No. 2006-0122306, Publication Date Jun. 8, 2006.

Co-pending U.S. Appl. No. 11/294,249 filed Dec. 05, 2005, Publication No. 2006-0148957, Publication Date Jul. 6, 2006.

International Search Report, date of mailing Sept. 11, 2006, PCT Application PCT/US05/44230.

Notification of Transmittal of the International Search Report and the Written Opinion of the International Searching Authority, or the Declaration, date of mailing Aug. 28, 2006, for corresponding PCT application PCT/US05/43609.

Internal, non-public data generated by Eastman Chemical Company prior to Dec. 6, 2004. Sample numbers correspond to those in U.S. Appl. No. 11/292,441.

* cited by examiner

POLYESTER BASED COBALT CONCENTRATES FOR OXYGEN SCAVENGING COMPOSITIONS

This application claims the benefit of U.S. Provisional Application Ser. No. 60/633,524 filed Dec. 6, 2004, fully incorporated herein by reference.

FIELD OF THE INVENTION

The invention pertains to the manufacture of polyester preforms and bottles, and more particularly to a concentrate containing at least a polyethylene terephthalate polymer and cobalt, useful for providing oxygen scavenging compositions, preforms, bottles and other articles.

BACKGROUND OF THE INVENTION

Packaging for food, beverages and in particular beer and fruit juices, cosmetics, medicines, and the like are sensitive to oxygen exposure and require high barrier properties to oxygen and carbon dioxide to preserve the freshness of the package contents and avoid changes in flavor, texture and color. Blends containing small amounts of high barrier polyamides, such as poly(m-xylylene adipamide), typically known commercially as MXD6, with polyesters such as poly(ethylene terephthalate), PET, enhance the passive barrier properties of PET.

To further reduce the entry of oxygen into the contents of the package, small amounts of transition metal salts, such as cobalt salts, can be added to the blend of PET and polyamide to catalyze and actively promote the oxidation of the polyamide polymer, thereby further enhancing the oxygen barrier characteristics of the package. The use of such active oxygen scavengers, which chemically remove oxygen migrating through the walls of the package, can be a very effective method to reduce the oxygen transmission rates of plastics used in packaging. While currently available scavengers have found some utility, they also suffer from a variety of drawbacks that include lengthy induction periods before full activity is achieved and/or life spans (capacities) which are too short. In some instances, these deficiencies can be partially addressed by increasing the level of oxygen scavenger in the package structure. However, this typically increases the cost of the final package and produces undesirable effects on the appearance of the package, such as adding haze or color. In addition, increasing the concentration of the oxygen scavenger can complicate manufacture and recycling of the package. Thus, there is a need for improved oxygen scavenging materials that rapidly achieve high scavenging rates.

Transition metal salts have been added to PET polymers and to blends of PET polymers with polyamide polymers to impart active oxygen scavenging activity. Typical methods for incorporating these metal salts into the PET composition include feeding the metal contained in a liquid carrier into an extruder along with a feed of bulk PET pellets. Alternatively, a metal such as cobalt is frequently added to a melt phase process for the production of PET, such that the PET pellets already contain cobalt when fed to the extruder. In this method, the metal salts can be added in low concentrations corresponding to the desired concentration in the article, or in higher concentrations to form a masterbatch. However, adding metal salts to a melt phase process for making the polymer may result in discoloration or the generation of excessive levels of other undesirable byproducts such as diethylene glycol and acetaldehyde at the high temperature conditions and long residence times employed in a PET polymerization reactor. This condition is exacerbated if the metal is added early or the residence time of the polymer melt containing the transition metal is lengthy.

We have found that deficiencies in the oxygen scavenging activity are partly attributable to the form in which the transition metal is added to PET. We have also found that when cobalt is added to a bulk polyester polymer in a form of a solid concentrate comprising a polyester carrier, a number of advantages are realized.

SUMMARY OF THE INVENTION

There is now provided a solid concentrate obtained by melt compounding a transition metal in an amount ranging from 1000 ppm to 40,000 ppm (by metal) and a polyester polymer having an It.V. of at least 0.55 dL/g in an amount of at least 40 wt. %, each based on the weight of the concentrate. By melt compounding, one has greater flexibility to use polyester polymers with higher IV to compensate for IV breakdown under melt conditions, to provide for a short residence time of the metal in the melt, and to make a blend under milder conditions that is typically encountered in a finisher or final reactor for making the polymer. Articles made from the concentrates of the invention may also more effectively scavenge oxygen compared to articles made from polyester polymers to which the transition metal was added in the melt phase. There is also provided a process for the manufacture of a preform comprising combining solid polyester particles comprising polyester polymers, solid polyamide particles comprising polyamide polymers, and a solid concentrate obtained by melt compounding a transition metal compound in an amount ranging from 1000 ppm to 40,000 ppm and a polyester polymer having an It.V. of at least 0.55 dL/g in an amount of at least 40 wt. %, each based on the weight of the concentrate, into a melt processing zone, forming a melt, and forming an article directly from the melt.

There is also provided a drying process, comprising simultaneously drying in a drying zone a blend comprising solid polyester particles comprising polyester polymers, solid polyamide particles comprising polyamide polymers, and a solid concentrate comprising a polyester polymer and a transition metal present in an amount ranging from 1000 ppm to 40,000, under conditions effective to at least partially remove moisture from the blend.

There is further provided a solid concentrate comprising a polyester polymer concentrate comprising a transition metal in an amount of at least 1000 ppm, and polyester polymers in an amount of at least 40 wt. %, each based on the weight of the concentrate, wherein at least a portion of the polyester polymers comprise highly modified polyester polymers containing hydroxyl modifier residues in an amount ranging from 20 mole % to 60 mole %, based on the all the moles of hydroxyl compound residues present in the polyester polymer and/or polycarboxylic acid modifiers in an amount ranging from 20 mole % to 60 mole %, based on all the moles of polycarboxylic acid residues present in the polyester polymer.

DETAILED DESCRIPTION OF THE INVENTION

Figure 1:
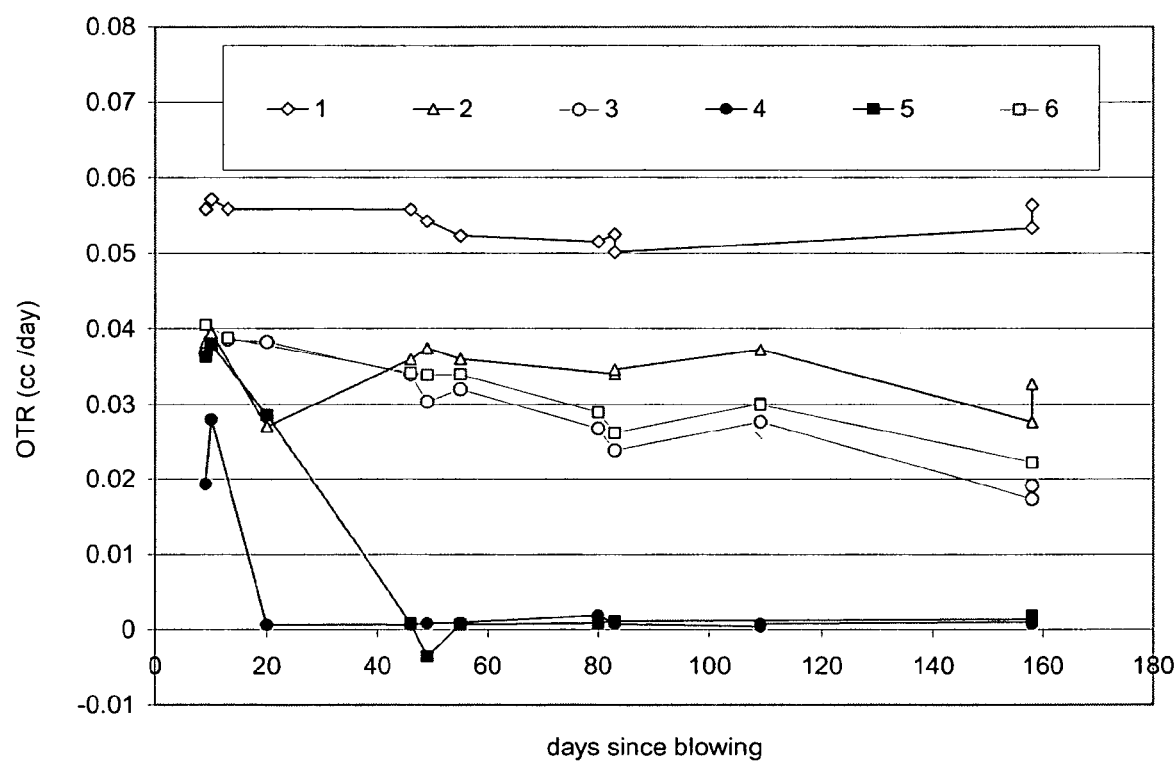
FIG. 1 is a graphical illustration of the oxygen transmission rate over time of bottles made from compositions of the invention compared to resin compositions in which the cobalt was added by other means

The present invention may be understood more readily by reference to the following detailed description of the invention.

It must also be noted that, as used in the specification and the appended claims, the singular forms "a," "an" and "the" include plural referents unless the context clearly dictates otherwise. For example, reference to processing or making a "polymer," a "preform," "article," "container," "concentrate" or "bottle" is intended to include the processing or making of a plurality of polymers, preforms, articles, containers or bottles. References to a composition containing "an" ingredient or "a" polymer is intended to include other ingredients or other polymers, respectively, in addition to the one named.

By "comprising" or "containing" or "obtained by" is meant that at least the named compound, element, particle, or method step etc. must be present in the composition or article or method, but does not exclude the presence of other compounds, catalysts, materials, particles, method steps, etc., even if the other such compounds, material, particles, method steps etc. have the same function as what is named, unless expressly excluded in the claims.

It is also to be understood that the mention of one or more method steps does not preclude the presence of additional method steps before or after the combined recited steps or intervening method steps between those steps expressly identified. Moreover, the lettering of process steps is a convenient means for identifying discrete activities or steps, and unless otherwise specified, recited process steps can be arranged in any sequence. Expressing a range includes all integers and fractions thereof within the range. Expressing a minimum or up to a temperature or a temperature range in a process, or of a reaction mixture, or of a melt or applied to a melt, or of a polymer or applied to a polymer means in all cases that the reaction conditions are set to the specified temperature or any temperature, continuously or intermittently, within the range or above the lower stated amount or below the upper stated amount; and that the reaction mixture, melt or polymer are subjected to the specified temperature as set points and it is not required that the particular reaction mixture, melt or polymer actually reach or remain at that particular temperature.

The intrinsic viscosity values described throughout this description are set forth in dL/g units as calculated from the inherent viscosity measured at 25° C. in 60/40 wt/wt phenol/tetrachloroethane according to the calculations immediately prior to Example 1 below.

The L* value is a measure of brightness. This value is measured in accordance with ASTM D 1746 for discs, plaques, preforms or bottle sidewalls (transmission mode). Color measurement theory and practice are discussed in greater detail in "Principles of Color Technology", pp.25–66 by John Wiley & Sons, New York (1981) by Fred W. Billmeyer, Jr. Brightness is measured as L* in the CIE 1976 opponent-color scale, with 100% representing a colorless sample transmitting 100% at all wavelengths. An L* of 100 in a colorless sample in the transmittance mode would be perfectly transparent, while an L* of 0 in a colorless sample would be opaque.

When catalyzed with appropriate transition metals, such as cobalt, blends of polyesters with polyamides can scavenge oxygen, producing articles with very low oxygen transmission rates. Addition of cobalt to such blends by way of a concentrate comprising at least a polyester polymer and the transition metal provides at least one advantage, if not a combination of several advantages, over other methods of incorporating the cobalt, such as liquid carrier addition or in other embodiments adding the metal to the melt phase for the manufacture of the polyester polymer.

Not all embodiments will achieve all the advantages described herein. However, at least one of the advantages can be obtained in one or more of the embodiments described herein, such advantages being:

liquid carriers can volatilize when introduced to warm (from the drying step) polyester and/or polyamide pellets, either at the injection molding machine, or in a separate preblending step. Volatilization can be significantly reduced or eliminated through the use of a solid polyester based metal concentrate;

the addition of the solid concentrate results in easier clean up than addition of cobalt in a liquid carrier;

a solid concentrate of transition metal and polyester is more stable than the corresponding liquid carrier containing the transition metal. For example, cobalt in a liquid carrier may settle resulting in concentration variation throughout the sample of carrier. We have also noticed significant changes over time in the flow characteristics of some liquid concentrates, while polyester based cobalt concentrates are stable;

the color of preforms and bottles stretch blow molded from the preforms containing polyamides and made with the cobalt containing solid concentrates have better b* and L* color than those made with cobalt contained in a liquid carrier;

significant flexibility in the process for making blends of polyester, polyamide and cobalt. In particular, the concentrate approach allows all materials, including the concentrate pellets, polyester pellets and polyamide pellets, to be mixed and then conveyed in conventional PET processing equipment and dried at normal PET drying conditions. Surprisingly, this "codrying" results in materials with better color than similar compositions prepared using liquid concentrates where the polyester and polyamide components are dried separately prior to mixing;

by using solid concentrates containing cobalt over liquid carriers containing cobalt, the haze level of bottle preforms is reduced when the cobalt is obtained from a solid cobalt concentrate relative to a comparable preform containing the same or less amount of cobalt obtained from a liquid carrier;

the addition of cobalt through the use of solid concentrates is more effective as an oxidation catalyst than cobalt which has been added during the melt phase polymerization of the bulk polyester polymer; and highly modified polyester polymers compounded with the transition metals are easier to pelletize because such concentrates are not as brittle and form fewer sticks compared to the same concentrates made with polyester polymers which are only slightly modified.

In a first embodiment, there is provided a solid concentrate obtained by melt compounding a transition metal compound in an amount ranging from 1000 ppm to 40,000 ppm (by metal) and a polyester polymer having an It.V. of at least 0.55 dL/g in an amount of at least 40 wt. %, each based on the weight of the concentrate.

In all embodiments, the pellet concentrate is a solid when measured at 1 atmosphere and at 25° C. In the first embodiment, the concentrate contains a transition metal, added during melt compounding, present in an amount ranging from 1000 ppm to 40,000 based on the metal atom content. In one embodiment, the amount of metal is suitable to provide a preform containing from 30 ppm, or from 50 ppm up to 500 ppm, or up to 300 ppm transition metal. As used throughout, a stated ppm range of metal, or "by metal" is based on the weight of the metal component of the metal compound added and not on the weight of the metal compound. Suitable amounts of metal within the concentrate range from at least 1500 ppm, or at least 2000 ppm, or at least 2500 ppm. Concentrates may contain amounts of metal within the concentration range of at least 1000 ppm, or at least 2,000 ppm, or at least 3,000 ppm, and up to 40,000 ppm, or up to 20,000 ppm, or up to 15,000 ppm, or up to 10,000 ppm, or up to 8000 ppm, or up to 7000, or up to 6000, or less than 5000. The amount of metal may be measured by X-ray fluorescence (X-Ray) or Inductively Coupled Plasma—Mass Spectrometry (ICP).

The type of transition metal present in the concentrate is effective to activate or promote the oxidation of an oxidizable polymer such as a polyamide polymer. The mechanism by which these transition metals function to activate or promote the oxidation of the polyamide polymer is not certain. For convenience, these transition metals are referred to herein as an oxidation catalysts, but the name does not imply that the mechanism by which these transition metals function is in fact catalytic or follows a catalytic cycle. The transition metal may or may not be consumed in the oxidation reaction, or if consumed, may only be consumed temporarily by converting back to a catalytically active state. As noted in U.S. Pat. No. 5,955,527, incorporated fully herein by reference, a measure of the catalyst may be lost in side reactions, or the catalyst may be viewed as an initiator "generating free radicals which through branching chain reactions leads to the scavenging of oxygen out of proportion to the quantity of "catalyst"."

Suitable examples of transition metals include cobalt, copper, rhodium, platinum, rhenium, ruthenium, palladium, tungsten, osmium, cadmium, silver, tantalum, hafnium, vanadium, titanium, chromium, nickel, zinc, and manganese. Preferred is cobalt.

The use of the word "metal", or any of the specific metals such as cobalt, means the metal in any oxidation state. Examples of cobalt include cobalt added to or at least a portion of which is present in the +2 or +3 oxidation state in the concentrate, or cobalt metal in the 0 oxidation state as elemental cobalt. Most preferred is cobalt added in the +2 oxidation state.

In an oxidation state other than 0, a metal is typically added or present as a salt, oxide, or other counter-ion. Suitable counter-ions to the metal among others include carboxylates, such as neodecanoates, octanoates, acetates, lactates, naphthalates, malates, stearates, acetylacetonates, linoleates, oleates, palmitates, 2-ethylhexanoates, or ethylene glycolates; oxides; borates; carbonates; chlorides; dioxides; hydroxides; nitrates; phosphates; sulfates; or silicates and mixtures thereof.

Concentrates containing about 2000 to 8000 ppm cobalt, with cobalt added in +2 oxidation state in the form of a salt are preferred. Cobalt neodecanoate and cobalt acetate are examples of preferred salts. Cobalt neodecanoate is particularly preferred.

The concentrates of the first embodiment may be prepared by a variety of melt compounding methods known in the art. Any suitable equipment designed to melt the polyester polymer pellets, to combine the components of the concentrate, and mix them may be used. Alternatively, the functions may be performed in more than one piece of equipment. This may be in continuous or batch processes. Example of equipment that may be used include, but are not limited to, two-roll mills, two rotor mixers with open mixing chambers, internal mixers with a single rotor, internal mixers with multiple counterrotating rotors, internal mixers with multiple corotating rotors, internal mixers with multiple mixing chambers, single screw extruders, planetary screw extruders, corotating twin screw extruders, counterrotating twin screw extruders conical extruders, and the like. These mixing devices are well known in the art and described in many references, such as W. Michaeli, "Plastics Processing: An Introduction", Carl Hanser Verlag, Munich, 1995; "Polymer Mixing: Technology and Engineering", J. L. White, A. Y. Coran and A. Moet, Eds., Carl Hanser Verlag, Munich, 2001; and "Plastics Compounding: Equipment and Processing", D. B. Todd, Ed., Carl Hanser Verlag, Munich, 1998.

Alternatively, the components may also be mixed using static mixers in which the mixing elements are stationary and the mixing is accomplished by multiple reorientations of a melt stream containing the molten polymer and the cobalt salt as it flows through the static elements, or molten polymer may be mixed with the cobalt salt in stirred vessels.

The cobalt salt may be a mixture of cobalt salts and may be fed neat into the process for production of the concentrate, or in a suitable carrier.

In a preferred embodiment, manufacture of a solid polyester concentrate containing cobalt is accomplished by either dry feeding a separate stream or streams of polyester pellet base resin(s) and a separate stream of cobalt containing additive such as cobalt neodecanoate or by dry blending the polyester with the cobalt additive which may then be fed together to the melt processing zone of a twin-screw compounder such as manufactured by Werner & Pfleiderer for melt mixing at approximately 450–550 F and dispersing of the cobalt into the polyester matrix. The polyester/cobalt melt mixture is then quenched in water and cut into cylindrical pellets for further use in downstream application. The solidified pellets or concentrate can be used either in its amorphous form or it can be crystallized by agitating and heating above 300° F. for an extended time.

The concentrate also comprises a solid polyester polymer in an amount of at least 40 wt. %, or at least 50 wt. %, or at least 60 wt. %, or at least 80 wt. %, or at least 90 wt. %, or at least 95 wt. %, or at least 98 wt. % or at least 99 wt. %, based on the weight of the concentrate. In one embodiment, the concentrate is essentially free of polymers other than a polyester polymer.

The polyester polymers contained in the solid concentrate may be the same as or different from bulk polyester polymer fed to the melt processing zone for making the article. Suitable polyester polymers are those which are solid at 1 atmosphere and at 25° C. Preferred polyester polymers are those which contain aromatic repeating units, such as those containing repeating units of terephthalic acid residues, isophthalic acid residues, or naphthalenic acid residues. Polyethylene terephthalate, poly(dimethyl cyclohexane terephthalate), polytrimethylene terephthalate, polyethylene naphthalate, and copolymers thereof modified with up to 60 mole % of a modifier are preferred.

Suitable polyethylene terephthalate homopolymers and copolymers are modified with one or more polycarboxylic acid modifiers in a cumulative amount of 40 mole % or less, or 25 mole % or less, or 15 mole % or less, or 10 mole % or less, or 8 mole % or less, and/or one or more hydroxyl compound modifiers in an amount of 60 mol % or less, or 50 mole % or less, or 15 mole % or less, or 10 mole % or less, or 8 mole % or less (collectively referred to for brevity as "PET") and polyethylene naphthalate homopolymers and copolymers modified with a cumulative amount of 40 mole % or less, or less than 15 mole %, or 10 mole % or less, or 8 mole % or less, of one or more polycarboxylic acid modifiers or modified less than 60 mol %, or less than 50 mole %, or less than 15 mole %, or 10 mole % or less, or 8 mole % or less of one or more hydroxyl compound modifiers (collectively referred to herein as "PEN"), and blends of PET and PEN. A modifier polycarboxylic acid compound is a compound other than an acid compound present in an amount of greater than 50 mole %. A modifier h hydroxyl compound is a compound other than ethylene glycol.

The preferred polyester polymer is polyalkylene terephthalate, and most preferred is PET.

In a second embodiment, there is provided a polyester polymer concentrate comprising at least 1000 ppm of a transition metal, and polyester polymers in an amount of at least 40 wt. %, each based on the weight of the concentrate, wherein at least a portion of the polyester polymers comprise highly modified polyester polymers containing hydroxyl modifier residues in an amount ranging from 20 mole % to 60 mole %, based on the all the moles of hydroxyl compound residues present in the polyester polymer and/or polycarboxylic acid modifiers in an amount ranging from 20 mole % to 60 mole %, based on all the moles of polycarboxylic acid residues present in the polyester polymer. Desirably, the amount of highly modified polyester polymers is at least 25 wt. %, or at least 50 wt. %, or at least 75 wt. %, or at least 80 wt. %, or at least 90 wt. %, or at least 95 wt. %, or up to 100 wt. %, of the total amount of polyester polymers present in the concentrate. The technique for manufacturing the concentrate in this second embodiment is not particularly limited.

The metal content in the second embodiment is not particularly limited. Preferably, the transition metal concentration content in the second embodiment is preferably at least 1000 ppm, or at least 2,000 ppm, or at least 3,000 ppm, and up to 40,000 ppm, or up to 20,000 ppm, or up to 15,000 ppm, or up to 10,000 ppm, or up to 8000 ppm, or up to 7000, or up to 6000, or less than 5000.

At least a portion of the polyester polymers used in the concentrate of this second embodiment contain are copolymerized with a polycarboxylic acid or hydroxyl modifier, more preferably a hydroxyl modifier, such that the polymer contains the residues of the modifier used in an amount of at least 20 mole %, or at least 25 mole %, or at least 30 mole %, and up to 60 mole %, based on the moles of corresponding polycarboxylic acid residues or hydroxyl compound residues present in the polymer. Desirably, the modifier and especially the hydroxyl modifier is copolymerized in an amount ranging from 25 mole % to 60 mole %, or 25 mole % to 50 mole %, or 30 mole % to 50 mole %, based on the corresponding residues present in the polymer.

We have found that highly modified polyester polymers compounded with the transition metals are easier to pelletize because such blends are not as brittle compared to the same blends made with polyester polymers which are only slightly modified. Fewer "sticks" are formed during extrusion and cutting. A "stick" is a rod which forms as a result of strands breaking at the cutter blades. Sticks are characterized as rod shaped instead of pellet shaped, often exceeding a length of ⅛". Such sticks are undesirable when fed at the throat of an injection molding machine.

Since the highly modified polymers are less brittle when compounded with transition metals, higher loadings of transition metal into the polyester polymer are also now possible. Further, by using highly modified polyester polymers, the processing temperature of the melt in an extruder can lowered.

In this second embodiment, the transition metal may be added into the melt phase process for making the polyester polymer or may be added by melt compounding with a polyester polymer. However, it is preferred to add the transition metal by melt compounding the highly modified polyester polymer with the transition metal to obtain more advantages as noted above with respect to melt compounding.

More particularly, in this embodiment and preferably in other embodiments as described herein, the preferred polyester polymer used in the concentrate comprises:

(i) a polycarboxylic acid component comprising at least 60 mole %, or at least 85 mole %, or at least 92 mole %, or at least 94 mole %, residues of terephthalic acid, derivates of terephthalic acid, naphthalene-2,6-dicarboxylic acid, derivatives of naphthalene-2,6-dicarboxylic acid, or mixtures thereof, and (ii) a hydroxyl component comprising at least 40 mole %, or at least 50 mole %, and up to 80 mole % residues of ethylene glycol, with at least 20 mole %, or at least 25 mole %, or at least 30 mole %, and up to 60 mole %, of residues of a hydroxyl modifier based on 100 mole percent of the polycarboxylic acid residues and 100 mole percent hydroxyl residues in the polyester polymer.

The reaction of a polycarboxylic acid compound with a hydroxyl compound during the preparation of the polyester polymer is not restricted to the stated mole % ratios since one may utilize a large excess of a hydroxyl compound if desired, e.g. on the order of up to 200 mole % relative to the 100 mole % of polycarboxylic acid used. The polyester polymer made by the reaction does, however, contain the stated amounts of aromatic dicarboxylic acid residues and hydroxyl residues. Derivates of terephthalic acid and naphthalane dicarboxylic acid include $C_1$–$C_4$ dialkylterephthalates and $C_1$–$C_4$ dialkylnaphthalates, such as dimethylterephthalate and dimethylnaphthalate In addition to a diacid component of terephthalic acid, derivates of terephthalic acid, naphthalene-2,6-dicarboxylic acid, derivatives of naphthalene-2,6-dicarboxylic acid, or mixtures thereof, the polycarboxylic acid component(s) of the present polyester may include one or more additional modifier polycarboxylic acids. Such additional modifier polycarboxylic acids include aromatic dicarboxylic acids preferably having 8 to 14 carbon atoms, aliphatic dicarboxylic acids preferably having 4 to 12 carbon atoms, or cycloaliphatic dicarboxylic acids preferably having 8 to 12 carbon atoms. Examples of modifier dicarboxylic acids useful as an acid component(s) are phthalic acid, isophthalic acid, cyclohexanedicarboxylic acid, cyclohexanediacetic acid, diphenyl-4,4'-dicarboxylic acid, succinic acid, glutaric acid, adipic acid, azelaic acid, sebacic acid, and the like, with isophthalic acid, naphthalene-2,6-dicarboxylic acid, and cyclohexanedicarboxylic acid being most preferable. It should be understood that use of the corresponding acid anhydrides, esters, and acid chlorides of these acids is included in the term "polycarboxylic acid". It is also possible for trifunctional and higher order polycarboxylic acids to modify the polyester.

The hydroxyl component is made from hydroxyl compounds, which are compounds containing 2 or more hydroxyl groups capable of reacting with a carboxylic acid group. Preferred hydroxyl compounds contain 2 or 3 hydroxyl groups, more preferably 2 hydroxyl groups, and preferably are $C_2$–$C_4$ alkane diols, such as ethylene glycol, propane diol, and butane diol, among which ethylene glycol is most preferred for container applications.

In addition to these diols, other modifier hydroxyl compound component(s) may include diols such as cycloaliphatic diols preferably having 6 to 20 carbon atoms and/or aliphatic diols preferably having 3 to 20 carbon atoms. Examples of such diols include diethylene glycol; propane-1,3-diol and butane-1,4-diol (each of which are considered modifier hydroxyl compounds if ethylene glycol residues are present in the polymer in an amount of greater than 50 mole % based on the moles of all hydroxyl compound residues); triethylene glycol; 1,4-cyclohexanedimethanol; pentane-1,5-diol; hexane-1,6-diol; 3-methylpentanediol-(2,4); neopentyl glycol; 2-methylpentanediol-(1,4); 2,2,4-trimethylpentane-diol-(1,3); 2,5-ethylhexanediol-(1,3); 2,2-diethyl propane-diol-(1,3); hexanediol-(1,3); 1,4-di-(hydroxyethoxy)-benzene; 2,2-bis-(4-hydroxycyclohexyl)-propane; 2,4-dihydroxy-1,1,3,3-tetramethyl-cyclobutane; 2,2-bis-(3-hydroxyethoxyphenyl)-propane; and 2,2-bis-(4-hydroxypropoxyphenyl)-propane. Typically, polyesters such as polyethylene terephthalate are made by reacting a glycol with a dicarboxylic acid as the free acid or its dimethyl ester to produce an ester monomer and/or oligomers, which are then polycondensed to produce the polyester.

Preferred modifiers include isophthalic acid, naphthalenic dicarboxylic acid, trimellitic anhydride, pyromellitic dianhydride, butanediol, 1,4-cyclohexane dimethanol, 2,4-dihydroxy-1,1,3,3-tetramethyl-cyclobutane, trimethylene glycol, neopentyl glycol, and diethylene glycol.

The amount of the polyester polymer in the formulated polyester polymer composition ranges from greater than 50.0 wt. %, or from 80.0 wt. %, or from 90.0 wt. %, or from 95.0 wt. %, or from 96.0 wt. %, or from 97 wt. %, and up to about 99.90 wt. %, based on the combined weight of all polyester polymers and all other polymers. The formulated polyester polymer compositions may also include blends of formulated polyester polymer compositions with other thermoplastic polymers such as polycarbonate. It is preferred that the polyester composition should comprise a majority of the formulated polyester polymer composition of the inventions, more preferably in an amount of at least 80 wt. %, or at least 90 wt. %, based on the weight of the composition (excluding fillers, inorganic compounds or particles, fibers, impact modifiers, or other polymers serve as impact modifiers or which form a discontinuous phase such as may be found in cold storage food trays).

The polyester polymers can be prepared by polymerization procedures known in the art sufficient to effect esterification and polycondensation. Polyester melt phase manufacturing processes include direct condensation of a dicarboxylic acid with the diol, optionally in the presence of esterification catalysts, in the esterification zone, followed by polycondensation in the prepolymer and finishing zones in the presence of a polycondensation catalyst; or ester exchange usually in the presence of a transesterification catalyst in the ester exchange zone, followed by prepolymerization and finishing in the presence of a polycondensation catalyst, and each may optionally be solid stated according to known methods.

In one embodiment, the It.V. of the concentrates made with highly modified polyester polymers ranges from about at least 0.60, or at least 0.70, or at least 0.75, and up to about 1.15 dL/g.

In another embodiment, the It.V. of the polyester polymers used to make the concentrate in a melt compounding process, and prior to preparation of the concentrate, ranges from about at least 0.55, or at least 0.65, or at least 0.70, or at least 0.75, and up to about 1.15 dL/g. In this embodiment, the concentrates are made by melt compounding the elements together.

The molten polymer from the melt phase polymerization may be allowed to solidify and/or obtain any degree of crystallinity from the melt. Alternatively, the molten polymer can be first solidified and then crystallized from the glass.

In yet another embodiment, the polyester polymers used to make the concentrate in a melt compounding process, or the concentrates themselves made with highly modified polyester polymers regardless of their method of preparation, preferably have an It.V. of at least 0.68 dL/g, or at least 0.70 dL/g, or at least 0.72 dL/g, or at least 0.76 dL/g, and even at least 0.80 dL/g, such It.V. obtained in the melt phase for the manufacture of the polyester polymer. In other words, the It.V. of the polyester polymer to which is blended the metal is obtained without solid state polymerizing the polymer. Providing a polyester polymer with high It.V. obtained in the melt phase polycondensation reaction avoids the expensive and time consuming step of solid state polymerizing the polymer to increase its It.V.

The polyester polymers in the concentrate may be either semicrystalline or essentially amorphous in nature. However, if the resulting polyester is essentially amorphous (5% crystallinity or less), compositions having a DSC Tg of about 70° C. or greater are preferred.

The polyester polymer composition used as the bulk polyester polymer fed to the melt processing zone also has a composition within the scope of the foregoing description. The composition of the polyester polymer in the concentrate can be tailored through incorporation of comonomers such as 1,4 cyclohexanedimethanol, isophthalic acid, naphthalene dicarboxylic acid, diethylene glycol, and other modifiers to adjust properties of the final polyester blend such as Tg and crystallization kinetics, or as needed to match the composition of the bulk polyester polymer fed to the melt processing zone for making the article.

The composition of the article is not particularly limited. Examples of compositions are those in which a metal is effective to enhance the reheat rate of preforms and trays, reduce the coefficient of friction of bottles, impact modify, and scavenge oxygen, relative to the same compositions which do not contain the metal. For example, there is provided an article comprising an oxidizable polymer or oxygen scavenging polymer in an amount ranging from about 1 to about 10%, or from 1 to 5 wt. %, from about 30 to 300 ppm, or 50 to 200 ppm, of a transition metal such as Co, and a polyester polymer present in an amount ranging from about 90 wt. % to 99 wt. % based on the weight of all ingredients contained in the article In such compositions, at least a portion of the total amount of transition metal present in the article is added to a melt processing zone by way of a solid concentrate containing the metal. In an oxygen scavenging composition, the article also preferably contains zinc in an amount ranging from 50 ppm to 300 ppm, preferably from 50 ppm to 150 ppm.

In all cases, the concentrate will contain a higher concentration of the metal than present in the article composition. Let down ratios of the metal concentration in the concentrate to the metal concentration in the article composition can range from 30:1 up to 200:1.

Any conventional process used to add concentrates to a bulk stream of polymer in a melt processing zone for making the article is suitable. For example, pellets of polyester, scavenger and polyester based cobalt concentrate can be blended, either prior to or after drying, and fed to an injection molding machine or extruder, followed by melt blending and forming into an article such as a preform. Alternatively, the pellets may be fed to the melt processing zone as individual streams, or in a combination of streams with one or more of the streams being a combination of two or more types of pellets.

An article which is effective to scavenge oxygen contains an oxidizable polymer in addition to the polyester polymer. Oxidizable polymers include polymers having an active methylene group, such as may be found on allylic group hydrogen atoms, benzylic group hydrogens, and alpha oxyalkylene hydrogens. Such hydrogen atoms may be expressed in the following respective structural moieties or repeating units as being linked to the carbons illustrated in bold:

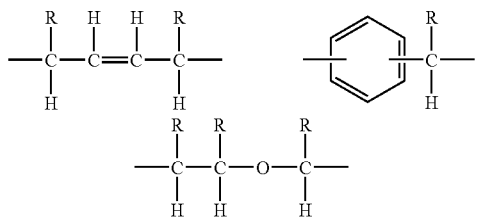

wherein R is a hydrogen or an alkyl group.

Examples of oxidizable polymers include polyamide polymers, and copolymers of α-olefins such as 1,4-butadiene with a polyester polymer. Most preferred are oxidizable polyamide polymers, especially those containing a benzylic hydrogen. From a viewpoint of their commercial availability, cost, and performance, preferred polyamides are obtained from a reactant containing a xylylene moiety, or a m-xylylene moiety, or a polymer containing any one of these residues in the polymer chain. More preferred examples include poly(m-xylylene adipamide) modified or unmodified polyamides, and poly(m-xylylene adipamide-co-isophthalamide) modified or unmodified polyamides. The polyamide polymer has a number average molecular weight Mn of 45,000 or less, or 35,000 or less, or 25,000 or less, or 15,000 or less, or 12,000 or less, or 8,000 or less, or 5,500 or less and greater than 1,000, or greater than 3,500. While such low molecular weight polyamide polymers are not considered to be of film forming molecular weight, their low molecular weight increases the terminal amino group concentration relative to using higher molecular weight polyamide polymers.

The concentrate of the invention is preferably substantially free of a polyamide polymer. In an oxygen scavenging composition, we have found that articles made from bulk polyester polymers fed to a melt processing zone along with a single stream of concentrate pellets made by melt blending a polyamide polymer, a polyester polymer, and a metal such as cobalt surprisingly do not scavenge oxygen as effectively as those made by feeding bulk polyester polymer pellets to a melt processing zone along with two other distinct streams of pellets, one comprising concentrates made by melt blending a polyester polymer with the metal and another stream comprising polyamide polymer pellets. Accordingly, the concentrate particles of the invention are preferably substantially free of (e.g. less than 0.5 wt. %), and more preferably does not contain any added polyamide polymer.

The polyester polymer particles, the concentrate particles, and the polyamide polymer particles may be fed to the melt processing zone as individual streams or as combined streams of particle/particle dry blends. In this preferred embodiment, the polyamide polymers are not melt blended with the polyester polymers in the concentrates. Preferably, the oxygen scavenging polymer is fed to a melt processing zone as a distinct separate stream from the concentrate particles.

Thus, in another embodiment, there is provided a process for the manufacture of a preform comprising combining solid polyester particles comprising polyester polymers, solid polyamide particles comprising polyamide polymers, and solid concentrate particles obtained by melt compounding together a polyester polymer in an amount of at least 40 wt. % and a transition metal in an amount ranging from 1000 ppm to 40,000 ppm, based on the weight of the solid concentrate particles, into an melt processing zone, forming a melt, and forming an article directly from the melt. In this embodiment, it is more preferred that the solid concentrate is substantially free of a polyamide polymer.

The polyester polymer and metal are separately, or in combination, optionally dried in an atmosphere of dried air or dried nitrogen. In one method of incorporation, the polyester polymer particles and the metal are melt compounded, for example, in a single or twin screw extruder. After completion of the melt compounding, the extrudate is withdrawn in strand form, and recovered according to the usual way such as cutting. By using a highly modified polyester polymer, the strands are less brittle when drawn through the water bath prior to cutting, resulting in fewer strands shattering and fewer sticks, and providing the benefit that higher loadings of transition metal are now possible.

One the transition metal concentrate pellets are made, they are fed into a melt extrusion zone for making the article. A separate stream of polyester polymer particles, a third stream containing a source of polyamide polymer, and optionally a fourth stream containing other additives such as colorant, acetaldehyde scavengers, reheat agents, UV absorbers or inhibitors, stabilizers, thermal stabilizers, etc., are fed to a melt processing zone for making the article, and the concentrate is let down into the melt processing zone in an amount to provide the desired level of metal in the finished article.

In yet another embodiment a blend comprising solid polyester particles comprising polyester polymers, solid polyamide particles comprising polyamide polymers, and a solid concentrate comprising a polyester polymer and a transition metal present in an amount ranging from 1000 ppm to about 40,000 ppm are simultaneously dried in a drying zone, under conditions effective to at least partially remove moisture from the blend. In this embodiment, the method for making the concentrate is not particularly limited, and the types of polyester polymers used and their molecular weight as determined by It.V. are also not limited. The moisture level of the blend of particles can be reduced down to less than 0.015 wt. %, or less than 0.010 wt. %, or less than 0.005 wt. %. In an apparatus containing a drying zone, radiant or convective heat, or electromagnetic or microwave radiation, or any other source for removal of moisture, is emitted from a drying zone or is passed through at least a portion of the mechanical drying zone and contacts the particle blend to remove at least a portion of surface and/or internal water moisture. Surprisingly, this co-drying method eliminates the need for multiple dryers and results in better color (higher L*, lower, b*, lower YI) than when the polyamide and polyester are dried separately and cobalt is added via a liquid concentrate.

In another embodiment, the preforms obtained using concentrates have lower haze than those obtained by using cobalt in a liquid carrier at comparable levels of cobalt. The haze levels of bottle sidewalls made from preforms containing 150 ppm or less of cobalt using the concentrates is preferably 4.0% or less, or 3.5% or less.

The articles obtained by the concentrates of the invention may be extruded products such as sheets and fibers, or injection molded articles such as bottle preforms and other shapes. In a preferred embodiment, the articles produced from the melt processing zone are the preforms, sheets, and trays for packaging food, pharmaceuticals, medical supplies, and beverages.

The articles are obtained directly from the melt in the melt processing zone for forming the articles. By directly is meant that the melt present in the melt processing zone for making the article is not pelletized and then remelted at later date to form the article.

The following non-limited examples further illustrate various embodiments of the invention.

EXAMPLES

Oxygen Transmission Rate (OTR) Procedure

The oxygen transmission rate test is performed using stretch blow molded bottles. The bottles are fitted following blow molding for oxygen package transmission testing. Prior to measurement, the bottle is sealed by gluing it to a brass plate that is connected to a 4 way valve over the finish. This mounting technique seals the bottle, while allowing for control of test gas access. The mounting is assembled as follows. First a brass plate is prepared by drilling two 1/8 inch holes into the plate. Two lengths of 1/8 soft copper tubing (which will be designated A and B) are passed through the holes in the plate and the gaps between the holes and the tubes are sealed with epoxy glue. One end of each of these tubes is attached to the appropriate ports on a 4-way ball valve (such as Whitey model B-43YF2). Tubing (which will be designated C and D) and connections are also attached to the other ports of the ball valve to allow the finished assembly to be connected to an Oxtran oxygen permeability tester (Modern Control, Inc. Minneapolis, Minn.).

This mounting is then glued to the finish of the bottle to be tested so that tubes A and B extend into the interior of the bottle. The open end of one tube is positioned near the top of the package and the open end of the other is positioned near the bottom to ensure good circulation of the test gas within the bottle. Gluing is typically performed in two steps using a quick setting epoxy to make the initial seal and temporarily hold the assembly together and then a second coating of a more rugged Metalset epoxy is applied. If desired the brass plate may be sanded before mounting to clean the surface and improve adhesion. If the 4 tubes are correctly connected to the 4-way valve, then when the valve is in the "Bypass" position, tubes A and B communicate and tubes C and D communicate, but tubes A and B do not communicate with tubes C and D. Thus the package is sealed. Similarly, when the valve is in its "Insert" position, tubes A and D communicate and tubes B and C communicate, but A and D do not communicate with tubes B and C, except through the interior of the bottle. Thus the bottle can be swept with purge or test gas.

Once the bottle is mounted on the assembly, it is swept with an oxygen-free gas, and the conditioning period begins. After several minutes of purging, the 4-way valve is moved to the Bypass position, sealing the bottle. At that point the entire bottle and mounting assembly may be disconnected from the purge gas supply without introducing oxygen into the interior of the bottle. Typically 2 or 3 bottles of each formulation are mounted for testing.

When the oxygen transmission rate of the bottle is to be tested, it is placed inside an environmental chamber. Under normal operation these chambers control the external conditions at 23° C. plus or minus 1° C. and 50% relative humidity plus or minus 10%. These chambers contain tubing connections to an Oxtran 1050 or Oxtran 1050A instrument and the mounting is connected to the Oxtran tester via tubes C and D. Carrier gas (nitrogen containing on the order of 1% hydrogen), which is humidified using a bubbler, is supplied to the instruments and the tubing in the environmental chamber. Both the Oxtran 1050 and 1050A use a coulometric sensor to measure oxygen transmission rates and both have positions for 10 samples to be mounted on the instrument at one time. Typically, 9 test bottles and 1 control package were run in a set. Once samples were mounted in the chamber, the 4-way valve is turned to the Insert position and the system is allowed to recover from the perturbation caused by this process.

After allowing the system to recover, the test is then begun by "inserting" the instrument sensor in-line. The test sequence is controlled by a specially written LabView™ software interface for the instrument. Basically, the instrument automatically advances through the test cells using a preset interval that allows the instrument to stabilize after each cell change as the test gas from the bottle mounted on the cell is routed through the coulometric sensor, generating a current. That current is passed through a resistor, which creates a voltage that is proportional to the oxygen transmission rate of the package plus the leak rate of that cell and package assembly. Typically the instrument is allowed to index through each of the cells 3 or more times and the average of the last 3 measurements is used. Once these readings are obtained, the 4-way valves are moved to their Bypass positions and this process is repeated, providing a measure of the leak rate for the cell and assembly. This value is subtracted from the value obtained for the package, cell and assembly to yield the value for the package. This value is corrected for the average barometric pressure in the laboratory and reported as the oxygen transmission rate (OTR) of the bottle (in either cc(STP) of oxygen/day or µl (STP) of oxygen/day). At this point the test is terminated and the bottles are removed from the instrument (with the 4-way valves still in the Bypass position).

Between tests, bottles are stored at ambient (RH, lighting, barometric pressure) conditions in a lab (22° C. plus or minus 4° C.) with the interior isolated from air. After a period of time, the bottle is reconnected to the Oxtran and a new set of transmission measurements collected. In this manner, it is possible to monitor the behavior of the bottle over several weeks or months.

The following cobalt concentrates were used in the examples

Solid Concentrate 1: is a polyester based concentrate of cobalt neodecanoate (TEN-CEM™ 22.5%) in Polyester Polymer Resin 3. The concentrate can be made by mixing the cobalt salt into Resin 3 melt using a 30 mm Werner & Pfleiderer twin screw extruder. The approximate level of cobalt in the concentrate is 3400 to 3900 ppm. Concentrate 1 is the concentrate for Examples 1, 2, 3, 6, 7 and 8.

Solid Concentrate 2 is a polyester based concentrate of cobalt acetate in Polyester Polymer Resin 4 produced by mixing the cobalt salt into a PET melt using a 30 mm Werner & Pfleiderer twin screw extruder. The approximate level of cobalt in the concentrate is 3400 to 3900 ppm.

Liquid Concentrate 1 is a concentrate of cobalt neodecanoate in a liquid dispersion with approximately 63,000 to 68,000 ppm cobalt.

Liquid Concentrate 2 is concentrate of cobalt neodecanoate in a liquid dispersion with approximately 35,000 to 40,000 ppm cobalt.

PA-A: is a poly(m-xyxlenediamine adipamide) commercially available from Mitsubishi Gas Chemical America, Inc., New York, N.Y. as MXD-6 grade 6007.

PA-B: is a poly(m-xyxlenediamine adipamide) commercially available from Mitsubishi Gas Chemical America, Inc., New York, N.Y. as MXD-6 grade 6121.

Polyester Polymer Resin 1: About a 0.87 intrinsic viscosity (It.V.) solid stated polyester polymer composition containing residues of dimethyl terephthalate, ethylene glycol, and cyclohexane dimethanol, with cyclohexane dimethanol residues representing about 1.8 mol % of the glycol residues, containing Ti, Mn, and Sb metal residues, phosphorus, iron, and UV dye and red and blue toners.

Polyester Polymer Resin 2: About a 0.80 ItV solid stated polyester polymer composition containing residues of terephthalate acid, ethylene glycol, and cyclohexane dimethanol, with cyclohexane dimethanol residues representing about 1.5 mole % of the glycol residues and red and blue toners and with Sb as a catalyst and phosphorus.

Polyester Polymer Resin 3: About a 0.80 ItV solid stated polyester polymer composition containing residues of dimethyl terephthalate, ethylene glycol, and cyclohexane dimethanol, with cyclohexane dimethanol residues representing about 3.5 mol % of the glycol residues, with red and blue toners and Ti, Mn and Sb catalyst residues along with phosphorus.

Polyester Polymer Resin 4: About a 0.76 ItV solid stated polyester polymer composition containing residues of dimethyl terephthalate, ethylene glycol and cyclohexane dimethanol with cyclohexane dimethanol residues representing about 1.8 mole % of the glycol residues, Sb, phosphorus, and Zn catalyst residues, along with red and blue toners.

Polyester Polymer Resin 5: About a 0.78 It.V. solid stated polyester polymer composition containing residues of dimethyl terephthalate and ethylene glycol, cyclohexane dimethanol, with cyclohexane dimethanol residues representing about 1.8 mol % of the glycol residues with Zn and Sb catalyst residues, phosphorous, Fe, along with UV dye and red and blue toners.

Polyester Polymer Resin 6: a 0.81 It.V. solid stated polyester polymer composition containing residues of dimethyl terephthalate and ethylene glycol, cyclohexane dimethanol, with cyclohexane dimethanol residues representing about 1.8 mol % of the glycol residues, with Zn and Sb catalyst residues, phosphorous, Fe, and UV dye and red and blue toners Polyester Polymer Resin 7: a 0.82 It.V. solid stated polyester polymer composition containing residues of dimethyl terephthalate and ethylene glycol, cyclohexane dimethanol, with cyclohexane dimethanol residues representing about 1.8 mol % of the glycol residues, with Zn and Sb catalyst residues, phosphorous, Fe, and UV dye and red and blue toners.

Polyester Polymer Resin 8: a 0.78 ItV solid stated polyester polymer composition containing residues of dimethyl terephthalate and ethylene glycol, Sb catalyst residue, phosphorous, Zn catalyst residue, and cobalt in an amount of 55 to 65 ppm.

Polyester Polymer Resin 9: a 0.71 ItV solid stated polyester polymer composition containing residues of dimethyl terephthalate, ethylene glycol and dimethyl isophthalate with dimethyl isophthalate residues representing about 2 mole % of the acid residues, Sb, phosphorous, Zn, and cobalt in an amount of 60 to 90 ppm.

Polyester Polymer Resin 10: is a 0.76 ItV solid stated polyester polymer composition containing residues of dimethyl terephthalate, ethylene glycol and dimethyl isophthalate with dimethyl isophthalate residues representing about 2 mole % of the acid residues, Sb, phosphorous, Zn, and cobalt in an amount of 60 to 70 ppm.

Polyester Polymer Resin 11: a 0.81 ItV solid stated polyester polymer composition containing residues of dimethyl terephthalate, ethylene glycol and dimethyl isophthalate with dimethyl isophthalate residues representing about 1.9 mole % of the acid residues, Sb, phosphorous, Mn, Ti, and cobalt in an amount of 100 to 110 ppm.

Polyester Polymer Resin 12: About a 0.76 ItV solid stated polyester polymer composition containing residues of terephthalic acid, ethylene glycol and cyclohexane dimethanol with cyclohexane dimethanol residues representing about 1.8 mole % of the glycol residues, Sb, phosphorous, and red and blue toners.

Polyester Polymer Resin 13: About a 0.80 ItV solid stated polyester polymer composition containing residues of dimethyl terephthalate, ethylene glycol, and cyclohexane dimethanol, with cyclohexane dimethanol residues representing about 4.5 mol % of the glycol residues, with red and blue toners and Zn and Sb catalyst residues along with phosphorus.

Polyester Polymer Resin 14. About a 0.80 ItV polyester polymer composition containing residues of dimethyl terephthalate, ethylene glycol, and cyclohexane dimethanol, with cyclohexane dimethanol residues representing about 31 mol % of the glycol residues, with red and blue toners and Ti and Mn catalyst residues along with phosphorus. The It.V. of this resin is obtained in a melt phase polymerization and is not solid state polymerized.

Polyester Polymer Resin 15. About a 0.80 ItV polyester polymer composition containing residues of dimethyl terephthalate, ethylene glycol, and cyclohexane dimethanol, with cyclohexane dimethanol residues representing about 31 mol % of the glycol residues, with red and blue toners and Ti and Mn catalyst residues along with phosphorus. The It.V. of this resin is obtained in a melt phase polymerization and is not solid state polymerized The glycol portion of each of the PET resins also contains low levels (less than 5 mol %) DEG residues, which are present as a natural byproduct of the melt polymerization process and may also be intentionally added as a modifier.

Example 1

This example demonstrates that it is preferred to let down the concentrate free of added polyamide polymer into an injection molding machine. 25 gram preforms and 20 oz straightwall bottles were produced from the following (nominal) oxygen scavenging compositions set forth in Table 1.

| Sample # | PA-A content (wt %) | Cobalt amt (ppm) | Method of addition to Melt Processing Zone | |
|---|---|---|---|---|
| | | | PA-A | Cobalt |
| 1 | 0 | 0 | NA | NA |
| 2 | 3 | 0 | Neat PA-A pellets | NA |
| 3 | 3 | 150 | PA-A/Cobalt | Concentrate |
| 4 | 3 | 150 | Neat PA-A pellets | Solid Concentrate 1 |
| 5 | 3 | 70 | Neat PA-A pellets | Solid Concentrate 1 |
| 6 | 2 | 100 | PA-A/Cobalt | Concentrate |

The bulk polyester polymer pellets fed to the injection molding machine is Polyester Polymer Resin 1. The concentrate used in the preparation of samples 3 and 6 is a polyester based concentrate of cobalt neodecanoate (TENCEM 22.5%) and PA-A in Polyester Polymer Resin 3. The concentrate can be made by mixing the cobalt salt and PA-A into Resin 3 using a 30 mm Werner & Pfleiderer twin screw extruder. The approximate level of cobalt in the concentrate is about 2000 ppm and the approximate level of PA-A in the concentrate is 40%. The components of this concentrate were dried prior to its preparation. The cobalt neodecanoate was dried overnight at 40° C. under vacuum, Polyester Polymer Resin 3 was dried with dehumidified air for 6 hrs at 325° F., and the PA-A was dried with dehumidified air for 6 hrs at 150° F.

The preforms are made by introducing the bulk Polyester Polymer Resin 1 pellets and the sources of cobalt and/or PA-A by the following method:

The PA-A and the PA-A/Co Concentrate were dried at 150 F while the bulk PET resin was dried in a separate system at 325 F. Solid Concentrate 1 was not dried. After drying but before injection molding, the PA-A or PA-A/Co Concentrate, bulk PET, and Solid Concentrate 1 were physically blended using a ribbon mixer. The blend was fed into a drying hopper with a temperature set point of 325 F, located directly over the feed throat of the injection molding machine. Extruder and manifold temperatures were set at 275° C. Clear preforms were molded using a Husky LX160PET-P60/50-E42 and an 8 cavity, 25 gram preform mold with a 28 mm finish.

Straight wall, 20 oz., carbonated soft drink style containers were blow molded using a Sidel SBO 2/3 at an output rate of 1200 bottles/hour/mold. A water temperature setting of 50 F was used to chill the blow mold cavities. Blow mold processing conditions were adjusted to produce containers with equivalent distribution of material throughout the bottle for each Sample to be submitted for OTR testing. Material distribution was characterized by dividing the container into sections and weighing each section. Material distribution was also characterized by measuring the thickness of the container wall using a Hall effect sensor by Magna-Mike Model 8000. Oven power was the primary adjustment made to achieve equivalent material distribution for each Sample. Oven profile configuration and pre-blow timing were also adjusted in some instances.

2 bottles per set were mounted and purged with oxygen free gas about 2 days after blowing and the OTR's of these samples were tested periodically. Results of these tests are presented in Table 2. FIG. 1 is a graphical illustration of the data presented in Table 2. As can be seen from the graph, the OTR of bottles made by letting down the stream of solid concentrate pellets of melt blended polyester polymers and cobalt, and a separate distinct stream of PA-A polyamide polymer pellets was lower and the induction period shorter than bottles made with a stream of concentrate melt blended pellets of PA-A polyamide polymer, polyester polymer, and metal.

TABLE 2

| Days since blowing | Sample 1 OTR (cc/day) | bottle # | Sample 2 OTR (cc/day) | bottle # | Sample 3 OTR (cc/day) | bottle # | Sample 4 OTR (cc/day) | bottle # | Sample 5 OTR (cc/day) | bottle # | Sample 6 OTR (cc/day) | bottle # |
|---|---|---|---|---|---|---|---|---|---|---|---|---|
| 9 | 0.0559 | 2 | 0.0382 | 2 | 0.0367 | 2 | 0.0193 | 2 | 0.0364 | 2 | 0.0405 | 2 |
| 10 | 0.0571 | 1 | 0.0395 | 1 | — | — | 0.0280 | 1 | 0.0379 | 1 | | |
| 13 | 0.0559 | 1 | — | — | 0.0386 | 1 | — | — | — | — | 0.0388 | 1 |

TABLE 2-continued

| Days since blowing | Sample 1 OTR (cc/day) | bottle # | Sample 2 OTR (cc/day) | bottle # | Sample 3 OTR (cc/day) | bottle # | Sample 4 OTR (cc/day) | bottle # | Sample 5 OTR (cc/day) | bottle # | Sample 6 OTR (cc/day) | bottle # |
|---|---|---|---|---|---|---|---|---|---|---|---|---|
| 20 | — | — | 0.0271 | 1 | 0.0383 | 2 | 0.0007 | 2 | 0.0286 | 2 | | |
| 46 | 0.0558 | 1 | 0.0360 | 1 | 0.0340 | 2 | 0.0006 | 2 | 0.0008 | 1 | 0.0342 | 1 |
| 49 | 0.0543 | 1 | 0.0374 | 2 | 0.0303 | 1 | 0.0008 | 1 | −0.0036 | 2 | 0.0339 | 2 |
| 55 | 0.0523 | 1 | 0.0361 | 1 | 0.0320 | 2 | 0.0009 | 2 | 0.0007 | 1 | 0.0340 | 1 |
| 80 | 0.0515 | 2 | — | — | 0.0268 | 2 | 0.0019 | 1 | 0.0009 | 1 | 0.0289 | 2 |
| 83 | 0.0525 | 1 | 0.0340 | 1 | 0.0239 | 1 | 0.0008 | 2 | 0.0012 | 2 | 0.0262 | 1 |
| 83 | 0.0501 | 2 | 0.0346 | 2 | — | — | — | — | 0.0011 | 1 | | |
| 109 | — | — | 0.0373 | 3 | 0.0277 | 1 | 0.0004 | 2 | — | — | 0.0301 | 2 |
| 109 | — | — | — | — | — | — | 0.0008 | 1 | — | — | 0.0300 | 1 |
| 158 | 0.0533 | 1 | 0.0277 | 1 | 0.0174 | 2 | 0.0010 | 1 | 0.0014 | 2 | 0.0223 | 2 |
| 158 | 0.0564 | 2 | 0.0327 | 2 | 0.0191 | 1 | 0.0007 | 2 | 0.0019 | 1 | 0.0222 | 1 |

Example 2

This example demonstrates that concentrates are effective at catalyzing oxygen scavenging activity over a range of compositions.

25 gram preforms and 20 oz straightwall bottles were produced from the following (nominal) oxygen scavenging compositions set forth in Table 3.

TABLE 3

| Sample # | Bulk PET | PA target amt (wt %) | PA Type | Co amount (ppm) |
|---|---|---|---|---|
| 7 | Resin 2 | 1 | PA-A | 100 |
| 8 | Resin 2 | 3 | PA-A | 100 |
| 9 | Resin 2 | 5 | PA-A | 100 |
| 10 | Resin 2 | 3 | PA-B | 30 |
| 11 | Resin 2 | 3 | PA-B | 150 |
| 12 | Resin 2 | 5 | PA-B | 30 |
| 13 | Resin 2 | 5 | PA-B | 150 |
| 14 | Resin 1 | 3 | PA-A | 100 |

In Samples 7–14, the source of cobalt was Solid Concentrate 1. The amount of cobalt added to the melt processing zone in the injection molding machine is varied to yield the stated amounts of cobalt in the article. The stream of bulk polyester polymer particles is as set forth in the second column of Table 3. The PA was fed to the injection molding machine as a separate stream of polyamide pellets.

The preforms and bottles are prepared by the following method:

Both types of PA were dried at 150 F while the bulk PET resin was dried in a separate system at 325 F. Solid Concentrate 1 was not dried. After drying but before injection molding, the selected PA, bulk PET, and Solid Concentrate 1 were physically blended using a ribbon mixer. The blend was fed into a drying hopper with a temperature set point of 325 F, located directly over the feed throat of the injection molding machine. Extruder and manifold temperatures were set at 536 F. Clear preforms were molded using a Husky LX160PET-P60/50-E42 and an 8 cavity, 25 gram preform mold with a 28 mm finish.

Straight wall, 20 oz., carbonated soft drink style containers were blow molded using a Sidel SBO 2/3 at an output rate of 1200 bottles/hour/mold. A water temperature setting of 50 F was used to chill the blow mold cavities. Blow mold processing conditions were adjusted to produce containers with equivalent distribution of material throughout the bottle for each Sample to be submitted for OTR testing. Material distribution was characterized by dividing the container into sections and weighing each section. Material distribution was also characterized by measuring the thickness of the container wall using a Hall effect sensor by Magna-Mike Model 8000. Oven power was the primary adjustment made to achieve equivalent material distribution for each Sample. Oven profile configuration and pre-blow timing were also adjusted in some instances.

Figure 2:
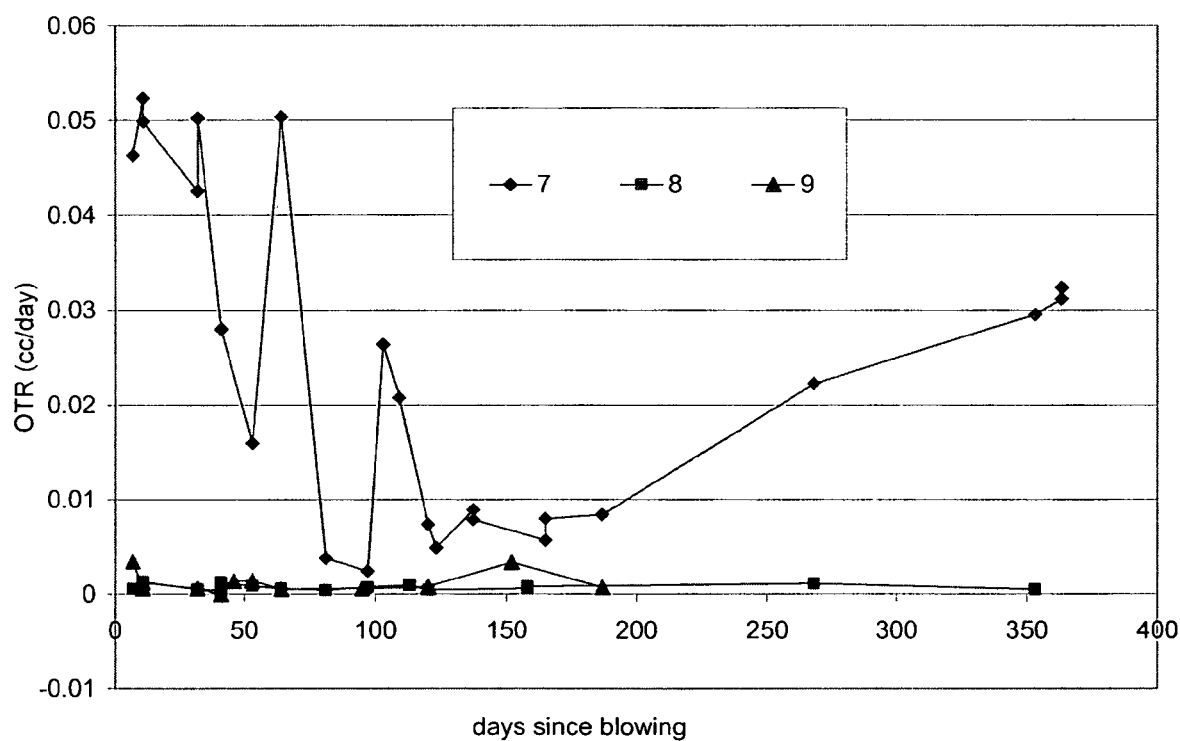
FIG. 2 is a graphical illustration of the oxygen transmission rate over time of bottles made from various compositions encompassed by the invention
Figure 3:
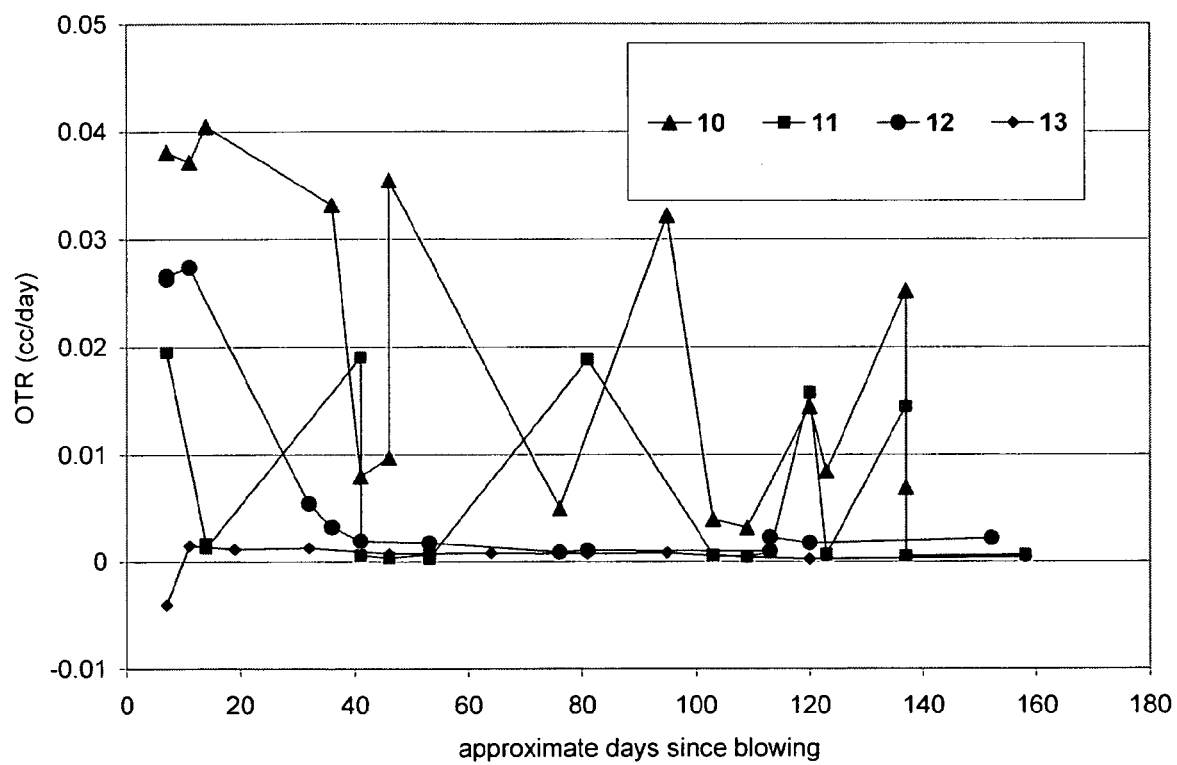
FIG. 3 is a graphical illustration of the oxygen transmission rate over time of bottles made from additional compositions encompassed by the invention
Figure 4:
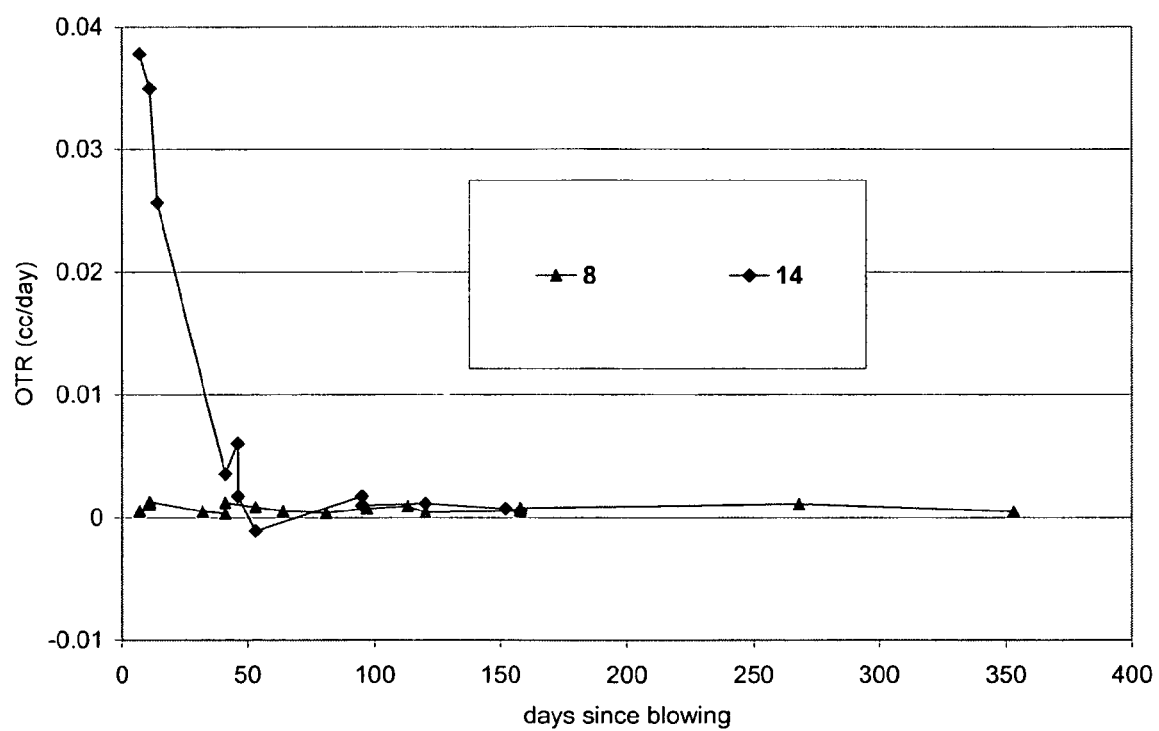
FIG. 4 is a also graphical illustration of the oxygen transmission rate over time of bottles made from additional compositions encompassed by the invention

3 bottles per set were mounted and purged with oxygen free gas the day following blowing and the OTR's of these samples were tested periodically. Results of these tests are presented in Table 4. FIGS. 2 through 4 graphically illustrate portions of the data presented in Table 4. As shown in the Figures, each of the bottles made from Concentrate 1 over a variety of cobalt concentrations, a variety of polyamide polymers, and a variety of bulk polyester polymers scavenge oxygen, although those containing about more than 50 ppm cobalt and/or more than 1 wt % of the polyamide polymer were more effective.

TABLE 4

| Days since blowing | Sample 7 OTR (cc/day) | # | Sample 8 OTR (cc/day) | # | Sample 9 OTR (cc/day) | # | Sample 10 OTR (cc/day) | # | Sample 11 OTR (cc/day) | # | Sample 12 OTR (cc/day) | # | Sample 13 OTR (cc/day) | # | Sample 14 OTR (cc/day) | # |
|---|---|---|---|---|---|---|---|---|---|---|---|---|---|---|---|---|
| 7 | 0.0463 | 3 | 0.0006 | 2 | 0.0034 | 2 | 0.0381 | 3 | 0.0195 | 2 | 0.0263 | 1 | −0.0040 | 1 | 0.0378 | 3 |
| 7 | — | — | — | — | — | — | — | — | — | — | 0.0266 | 2 | — | — | — | — |
| 11 | 0.0523 | 2 | 0.0011 | 2 | 0.0006 | 1 | 0.0372 | 2 | — | — | 0.0274 | 3 | 0.0015 | 2 | 0.0350 | 2 |
| 11 | 0.0499 | 1 | 0.0013 | 3 | 0.0012 | 3 | — | — | — | — | — | — | — | — | — | — |
| 14 | — | — | — | — | — | — | 0.0405 | 1 | 0.0017 | 3 | — | — | — | — | 0.0257 | 1 |
| 14 | — | — | — | — | — | — | — | — | 0.0013 | 1 | — | — | — | — | — | — |
| 19 | — | — | — | — | — | — | — | — | — | — | — | — | 0.0011 | 3 | — | — |
| 32 | 0.0425 | 2 | 0.0005 | 1 | 0.0006 | 3 | 0.0332 | 3 | 0.0191 | 2 | 0.0054 | 2 | 0.0013 | 1 | — | — |

TABLE 4-continued

| Days since blowing | Sample 7 OTR (cc/day) | # | Sample 8 OTR (cc/day) | # | Sample 9 OTR (cc/day) | # | Sample 10 OTR (cc/day) | # | Sample 11 OTR (cc/day) | # | Sample 12 OTR (cc/day) | # | Sample 13 OTR (cc/day) | # | Sample 14 OTR (cc/day) | # |
|---|---|---|---|---|---|---|---|---|---|---|---|---|---|---|---|---|
| 32 | 0.0502 | 3 | — | — | — | — | — | — | — | — | — | — | — | — | — | — |
| 36 | — | — | — | — | — | — | — | — | — | — | — | — | 0.0032 | 1 | — | — |
| 41 | 0.0280 | 1 | 0.0004 | 2 | −0.0001 | 1 | 0.0079 | 1 | 0.0006 | 1 | 0.0019 | 3 | — | — | 0.0035 | 2 |
| 41 | — | — | 0.0012 | 3 | — | — | — | — | — | — | — | — | — | — | — | — |
| 46 | — | — | — | — | 0.0014 | 2 | 0.0098 | 2 | 0.0003 | 3 | — | — | 0.0007 | 1 | 0.0061 | 1 |
| 46 | — | — | — | — | — | — | 0.0355 | 1 | — | — | — | — | — | — | 0.0018 | 3 |
| 53 | 0.0160 | 1 | 0.0009 | 3 | 0.0014 | 1 | — | — | 0.0007 | 1 | 0.0018 | 3 | — | — | −0.0011 | 2 |
| 53 | — | — | — | — | — | — | — | — | 0.0003 | 3 | — | — | — | — | — | — |
| 64 | 0.0504 | 3 | 0.0006 | 1 | 0.0005 | 3 | — | — | — | — | — | — | 0.0008 | 2 | — | — |
| 76 | — | — | — | — | — | — | 0.0049 | 3 | — | — | 0.0009 | 2 | — | — | — | — |
| 81 | 0.0038 | 2 | 0.0004 | 2 | — | — | — | — | 0.0189 | 2 | 0.0010 | 1 | 0.0007 | 3 | — | — |
| 95 | — | — | — | — | 0.0006 | 2 | 0.0322 | 1 | — | — | — | — | 0.0008 | 1 | 0.0017 | 3 |
| 95 | — | — | — | — | — | — | — | — | — | — | — | — | — | — | 0.0010 | 2 |
| 97 | 0.0024 | 1 | 0.0008 | 3 | — | — | — | — | — | — | — | — | — | — | — | — |
| 103 | 0.0264 | 3 | — | — | — | — | 0.0039 | 2 | 0.0006 | 1 | — | — | 0.0006 | 3 | — | — |
| 109 | 0.0208 | 3 | — | — | — | — | 0.0032 | 2 | 0.0005 | 1 | — | — | 0.0004 | 3 | — | — |
| 113 | — | — | 0.0009 | 1 | — | — | — | — | 0.0008 | 3 | 0.0010 | 2 | — | — | — | — |
| 113 | — | — | — | — | — | — | — | — | — | — | 0.0023 | 3 | — | — | — | — |
| 120 | 0.0074 | 2 | 0.0004 | 2 | 0.0007 | 1 | 0.0145 | 3 | 0.0158 | 2 | 0.0017 | 1 | 0.0003 | 2 | 0.0012 | 1 |
| 120 | — | — | — | — | 0.0008 | 3 | — | — | — | — | — | — | — | — | — | — |
| 123 | 0.0049 | 1 | — | — | — | — | 0.0085 | 3 | 0.0007 | 3 | — | — | — | — | — | — |
| 137 | 0.0089 | 2 | — | — | — | — | 0.0252 | 1 | 0.0145 | 2 | — | — | — | — | — | — |
| 137 | 0.0079 | 3 | — | — | — | — | 0.0069 | 2 | 0.0005 | 1 | — | — | — | — | — | — |
| 152 | — | — | — | — | 0.0034 | 2 | — | — | — | — | 0.0022 | 3 | — | — | 0.0007 | 3 |
| 158 | — | — | 0.0006 | 1 | — | — | — | — | 0.0006 | 3 | — | — | 0.0004 | 1 | 0.0006 | 2 |
| 158 | — | — | 0.0008 | 3 | — | — | — | — | — | — | — | — | — | — | — | — |
| 165 | 0.0057 | 1 | — | — | — | — | — | — | — | — | — | — | — | — | — | — |
| 165 | 0.0080 | 2 | — | — | — | — | — | — | — | — | — | — | — | — | — | — |
| 187 | 0.0084 | 3 | — | — | 0.0007 | 1 | — | — | — | — | — | — | — | — | — | — |
| 268 | 0.0222 | 3 | 0.0011 | 2 | — | — | — | — | — | — | — | — | — | — | — | — |
| 353 | 0.0295 | 3 | 0.0005 | 1 | — | — | — | — | — | — | — | — | — | — | — | — |
| 363 | 0.0312 | 1 | — | — | — | — | — | — | — | — | — | — | — | — | — | — |
| 363 | 0.0324 | 2 | — | — | — | — | — | — | — | — | — | — | — | — | — | — |

Example 3

This example demonstrates that solid concentrates are an effective means for adding oxidation catalysts to a range of bulk polyester polymer compositions. 25 gram preforms and 20 oz straightwall bottles were prepared from the following compositions using Solid Concentrate 1.

TABLE 5

| Sample # | Bulk PET | PA-A target amt (wt %) | Measured Co amount (ppm)* |
|---|---|---|---|
| 15 | Resin 1 | 3 | 101 |
| 16 | Resin 5 | 3 | 95 |
| 17 | Resin 6 | 3 | 86 |
| 18 | Resin 7 | 3 | 93 |

*by XRF.

In Samples 15–18, the source of cobalt was Solid Concentrate 1. The amount of Solid Concentrate 1 added to the melt processing zone in the injection molding machine is varied to yield the amounts of cobalt set forth in Table 5. The stream of bulk polyester polymer particles is as set forth in the second column of Table 5. The PA-A was fed to the injection molding machine as a separate stream of polyamide pellets.

The preforms and bottles are prepared by the following method:

The PA-A was dried at 150 F while the bulk PET resin was dried in a separate system at 325 F. Solid Concentrate 1 was not dried. After drying but before injection molding, the PA-A, bulk PET, and Solid Concentrate 1 were physically blended using a ribbon mixer. The blend was fed into a drying hopper with a temperature set point of 325 F, located directly over the feed throat of the injection molding machine. Extruder and manifold temperatures were set at 536 F. Clear preforms were molded using a Husky LX160PET-P60/50-E42 and an 8 cavity, 25 gram preform mold with a 28 mm finish.

Straight wall, 20 oz., carbonated soft drink style containers were blow molded using a Sidel SBO 2/3 at an output rate of 1200 bottles/hour/mold. A water temperature setting of 50 F was used to chill the blow mold cavities. Blow mold processing conditions were adjusted to produce containers with equivalent distribution of material throughout the bottle for each Sample to be submitted for OTR testing. Material distribution was characterized by dividing the container into sections and weighing each section. Material distribution was also characterized by measuring the thickness of the container wall using a Hall effect sensor by Magna-Mike Model 8000. Oven power was the primary adjustment made to achieve equivalent material distribution for each Sample. Oven profile configuration and pre-blow timing were also adjusted in some instances.

Figure 5:
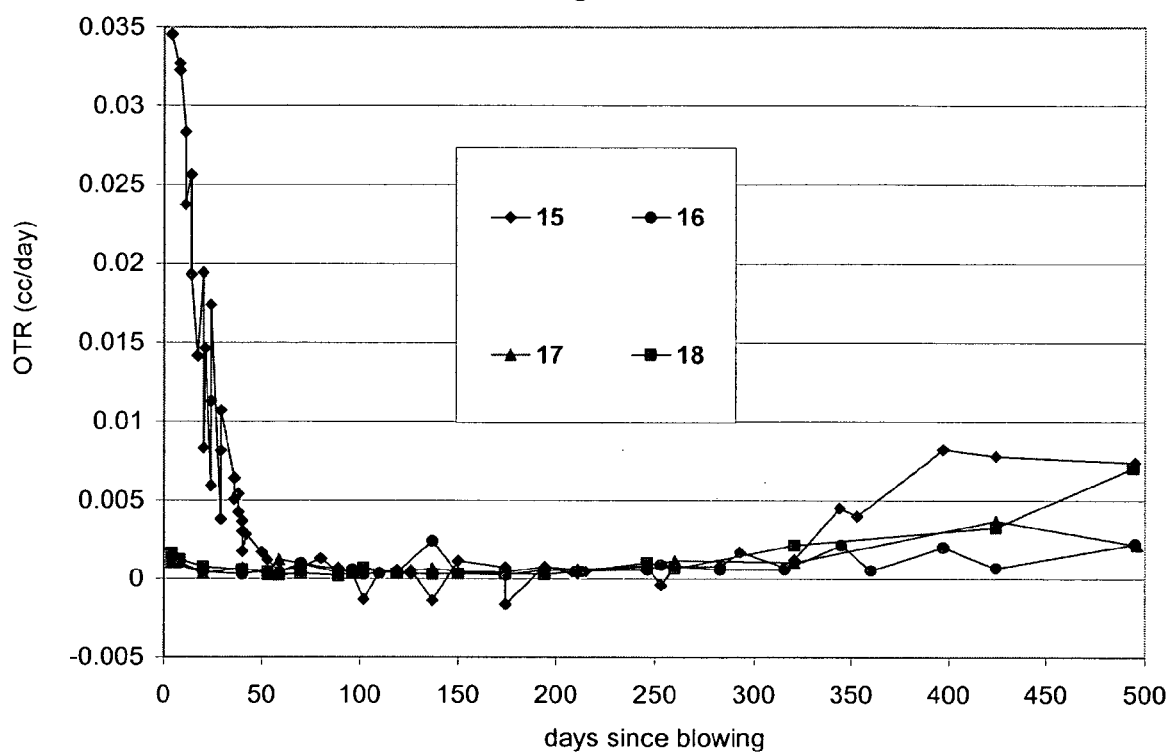
FIG. 5 is a graphical illustration of the long term performance of the oxygen transmission rate over time of bottles made from additional compositions encompassed by the invention

3 bottles per set were mounted and purged with oxygen free gas the day following blowing. OTR's of these samples were tested periodically. Results of these tests are presented in Table 6 and in the corresponding FIG. 5, which graphically illustrates the OTR results in Table 6.

TABLE 6

| Days since blow molding | Sample 15 OTR (ccSTP/day) | bottle # | Sample 16 OTR (ccSTP/day) | bottle # | Sample 17 OTR (ccSTP/day) | bottle # | Sample 18 OTR (ccSTP/day) | bottle # |
|---|---|---|---|---|---|---|---|---|
| 4 | 0.0346 | 3 | 0.0016 | 1 | 0.0012 | 3 | 0.0012 | 2 |
| 4 | — | — | 0.0012 | 2 | 0.0014 | 1 | 0.0017 | 1 |
| 4 | — | — | — | — | 0.0011 | 2 | — | — |
| 8 | 0.0323 | 2 | 0.0010 | 3 | — | — | 0.0012 | 3 |
| 8 | 0.0327 | 1 | — | — | — | — | — | — |
| 11 | 0.0283 | 1 | — | — | — | — | — | — |
| 11 | 0.0237 | 2 | — | — | — | — | — | — |
| 14 | 0.0256 | 1 | — | — | — | — | — | — |
| 14 | 0.0193 | 2 | — | — | — | — | — | — |
| 17 | 0.0142 | 3 | — | — | — | — | — | — |
| 20 | 0.0194 | 1 | 0.0004 | 3 | 0.0003 | 3 | 0.0008 | 1 |
| 20 | 0.0083 | 3 | — | — | — | — | — | — |
| 21 | 0.0146 | 2 | — | — | — | — | — | — |
| 24 | 0.0059 | 3 | — | — | — | — | — | — |
| 24 | 0.0113 | 2 | — | — | — | — | — | — |
| 24 | 0.0174 | 1 | — | — | — | — | — | — |
| 29 | 0.0038 | 3 | — | — | — | — | — | — |
| 29 | 0.0082 | 2 | — | — | — | — | — | — |
| 29 | 0.0107 | 1 | — | — | — | — | — | — |
| 36 | 0.0064 | 1 | — | — | — | — | — | — |
| 36 | 0.0051 | 2 | — | — | — | — | — | — |
| 38 | 0.0054 | 1 | — | — | — | — | — | — |
| 38 | 0.0043 | 2 | — | — | — | — | — | — |
| 40 | 0.0037 | 1 | 0.0003 | 1 | 0.0007 | 2 | 0.0006 | 2 |
| 40 | 0.0031 | 2 | — | — | — | — | — | — |
| 40 | 0.0018 | 3 | — | — | — | — | — | — |
| 42 | 0.0029 | 1 | — | — | — | — | — | — |
| 50 | 0.0017 | 1 | — | — | — | — | — | — |
| 53 | 0.0012 | 2 | 0.0005 | 1 | 0.0003 | 2 | 0.0005 | 2 |
| 59 | 0.0006 | 3 | — | — | — | — | — | — |
| 59 | 0.0005 | 1 | 0.0004 | 1 | 0.0012 | 1 | 0.0002 | 3 |
| 70 | 0.0007 | 1 | 0.0010 | 1 | 0.0010 | 1 | 0.0003 | 3 |
| 80 | 0.0013 | 1 | — | — | — | — | — | — |
| 89 | 0.0004 | 2 | 0.0004 | 2 | 0.0006 | 1 | 0.0002 | 2 |
| 89 | 0.0007 | 3 | — | — | — | — | — | — |
| 96 | 0.0004 | 1 | 0.0006 | 2 | 0.0004 | 2 | 0.0004 | 3 |
| 102 | −0.0013 | 2 | 0.0003 | 3 | 0.0006 | 1 | 0.0007 | 1 |
| 110 | 0.0004 | 1 | 0.0004 | 1 | — | — | — | — |
| 119 | 0.0006 | 3 | 0.0005 | 2 | 0.0004 | 2 | 0.0003 | 3 |
| 126 | 0.0003 | 2 | — | — | — | — | — | — |
| 126 | 0.0006 | 1 | — | — | — | — | — | — |
| 137 | −0.0014 | 2 | 0.0024 | 1 | 0.0007 | 1 | 0.0003 | 2 |
| 150 | 0.0012 | 1 | 0.0003 | 3 | 0.0004 | 2 | 0.0003 | 3 |
| 174 | 0.0007 | 3 | 0.0002 | 3 | 0.0004 | 2 | 0.0003 | 1 |
| 174 | −0.0016 | 1 | — | — | — | — | — | — |
| 194 | 0.0008 | 1 | 0.0006 | 1 | 0.0008 | 1 | 0.0003 | 3 |
| 208 | 0.0005 | 2 | — | — | — | — | — | — |
| 211 | 0.0003 | 3 | 0.0005 | 2 | 0.0006 | 2 | 0.0005 | 3 |
| 215 | 0.0005 | 1 | — | — | — | — | — | — |
| 246 | 0.0008 | 1 | 0.0006 | 1 | 0.0009 | 1 | 0.0011 | 1 |
| 253 | −0.0004 | 2 | 0.0009 | 3 | — | — | — | — |
| 260 | 0.0008 | 1 | — | — | 0.0012 | 2 | 0.0007 | 2 |
| 283 | 0.0008 | 3 | 0.0006 | 2 | — | — | — | — |

These examples further demonstrate that PET based cobalt concentrates are effective at catalyzing the oxygen scavenging activity over a range of bulk polyester compositions.

Example 4

This example illustrates that the addition of cobalt is not effective as an oxidation catalyst if added to a polyester polymer undergoing melt phase polymerization, whereas if added as a concentrate, the composition actively scavenges oxygen. 37 gram preforms and 16 oz bottles are prepared using the bulk PET resins listed in Table 7. PA-A is first heat treated. The compositions of these samples are set forth in Table 7.

TABLE 7

| Sample # | Bulk PET | Actual Co Level from X-ray: | Approximate PA-A amt (wt %) |
|---|---|---|---|
| 19 | Resin 8 | 62 | 1.2 |
| 20 | Resin 9 | 88 | 1.5 |
| 21 | Resin 10 | 68 | 1.6 |
| 22 | Resin 11 | 105 | 1.3 |

In Samples 19–22, the presence of cobalt in the preforms was solely as a result of adding cobalt acetate to the melt phase reaction during polycondensation for the polymerization of the bulk PET. None of the cobalt present in the sample was added by way of a concentrate. The PA-A was fed to the injection molding machine as a separate stream of polyamide pellets.

Figure 6:
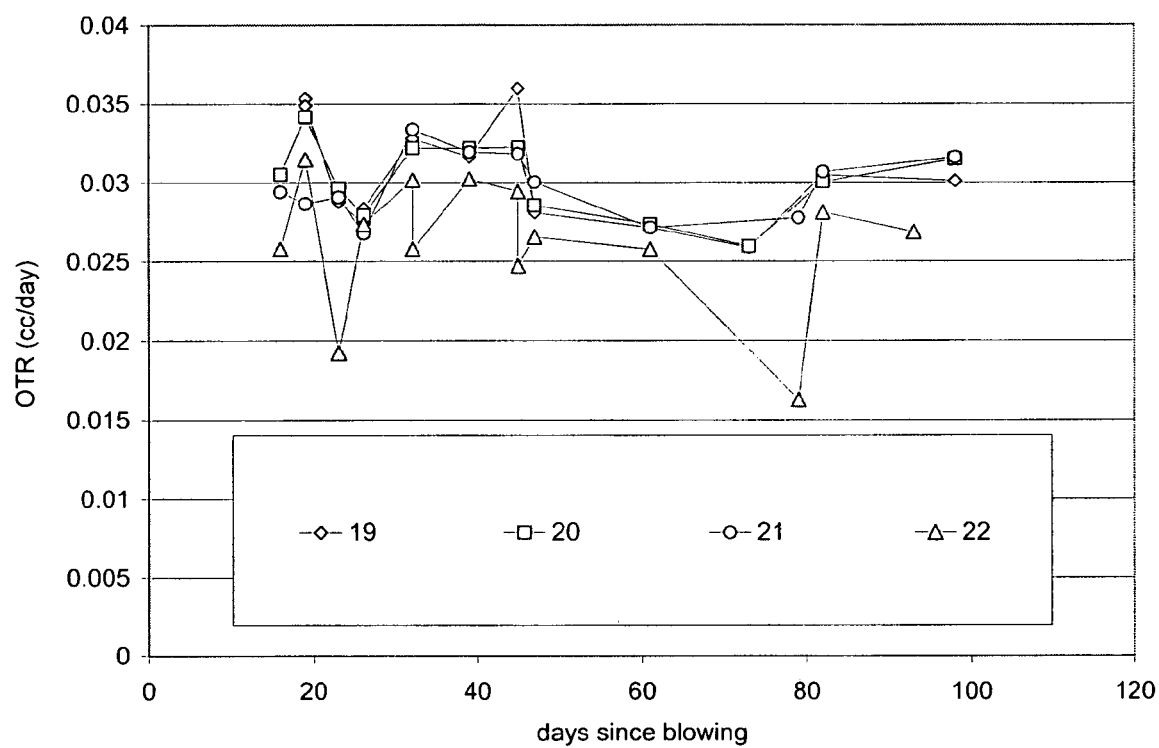
FIG. 6 is a graphical illustration of the oxygen transmission rate over time of bottles made from compositions in which cobalt was added to the polyester during the melt polymerization step

Preforms and bottles were prepared and mounted and purged with oxygen free gas 12 days after blowing. The OTR's of these samples were tested periodically. Results of these tests are presented in Table 8, and graphically illustrated in FIG. 6.

These comparative examples demonstrate that about 60 to 100 ppm cobalt added during the PET polymerization step is not effective at catalyzing the oxygen scavenging reactions in PET/PA-A blends, even though as shown in other foregoing examples, this same level of cobalt is effective when the cobalt is added by way of a solid Concentrate.

The blend was fed into a drying hopper with a temperature set point of 325 F, located directly over the feed throat of the injection molding machine. Extruder and manifold temperatures were set at 536 F. Clear preforms were molded using a Husky LX160PET-P60/50-E42 and a 4 cavity, 48 gram preform mold with a 43 mm finish.

One liter heatset containers were blow molded using a Sidel SBO 2/3-HR at an output rate of 1000 bottles/hour/mold. An oil temperature setting of 257 F was used to heat the blow mold cavities. The water heating the mold base was set to a target temperature of 176 F. Blow mold processing conditions were adjusted to produce containers with equivalent distribution of material throughout the bottle for each Sample to be submitted for OTR testing. Material distribu-

TABLE 8

| Days since blowing | Sample 19 OTR (cc/day) | Bottle # | Sample 20 OTR (cc/day) | Bottle # | Sample 21 OTR (cc/day) | Bottle # | Sample 22 OTR (cc/day) | Bottle # |
|---|---|---|---|---|---|---|---|---|
| 16 | — | — | 0.0305 | 2 | 0.0294 | 2 | 0.0258 | 1 |
| 19 | 0.0353 | 2 | 0.0342 | 3 | 0.0287 | 1 | 0.0315 | 2 |
| 19 | 0.0349 | 3 | — | — | — | — | — | — |
| 23 | 0.0288 | 2 | 0.0296 | 1 | 0.0291 | 3 | 0.0192 | 3 |
| 26 | 0.0274 | 2 | 0.0279 | 3 | 0.0268 | 2 | 0.0274 | 1 |
| 26 | 0.0284 | 3 | — | — | — | — | — | — |
| 32 | 0.0328 | 3 | 0.0322 | 2 | 0.0334 | 1 | 0.0302 | 2 |
| 32 | — | — | — | — | — | — | 0.0258 | 3 |
| 39 | 0.0316 | 2 | 0.0322 | 1 | 0.0319 | 3 | 0.0302 | 1 |
| 45 | 0.0360 | 3 | 0.0323 | 3 | 0.0318 | 2 | 0.0294 | 2 |
| 45 | — | — | — | — | — | — | 0.0247 | 3 |
| 47 | 0.0281 | 2 | 0.0286 | 2 | 0.0300 | 1 | 0.0266 | 1 |
| 61 | 0.0272 | 3 | 0.0274 | 1 | 0.0272 | 3 | 0.0258 | 2 |
| 73 | 0.0259 | 2 | 0.0260 | 3 | — | — | — | — |
| 79 | — | — | — | — | 0.0278 | 2 | 0.0163 | 3 |
| 82 | 0.0305 | 3 | 0.0301 | 2 | 0.0307 | 1 | 0.0281 | 1 |
| 93 | — | — | — | — | — | — | 0.0269 | 2 |
| 98 | 0.0301 | 2 | 0.0315 | 1 | 0.0316 | 3 | — | — |

Example 5

This example demonstrates that the cobalt added by way of a solid concentrate, is as effective at catalyzing oxygen scavenging reactions as cobalt added by way of a liquid carrier.

48 gram preforms and 1 liter bottles were prepared using Resin 5 as the bulk PET, PA-A pellets added neat, and two different cobalt sources, LIQ1 and Solid Concentrate 2. The composition of the preforms is as set forth in Table 9.

TABLE 9

| Sample # | Co Source | Zn | Co | Sb | P | PA-A wt % |
|---|---|---|---|---|---|---|
| 23 | LIQ1 | 60 | 103 | 231 | 76 | 1.24 |
| 24 | Conc 2 | 60 | 65 | 231 | 76 | 1.99 |
| 25 | Conc 2 | 61 | 97 | 232 | 77 | 1.4 |

* by HNMR, metal levels by XRF

The PA-A was fed to the injection molding machine as a separate stream of polyamide pellets. The preforms and bottles are prepared by the following method:

The PA-A was dried at 150 F while the bulk PET resin was dried in a separate system at 325 F. The solid cobalt Concentrates were dried overnight at 150° F. After drying but before injection molding, the PA-A, bulk PET, and Co Concentrate were physically blended using a ribbon mixer.

tion was characterized by dividing the container into sections and weighing each section. Material distribution was also characterized by measuring the thickness of the container wall using a Hall effect sensor by Magna-Mike Model 8000. Oven power was the primary adjustment made to achieve equivalent material distribution for each Sample. Oven profile configuration and pre-blow timing were also adjusted in some instances.

Figure 7:
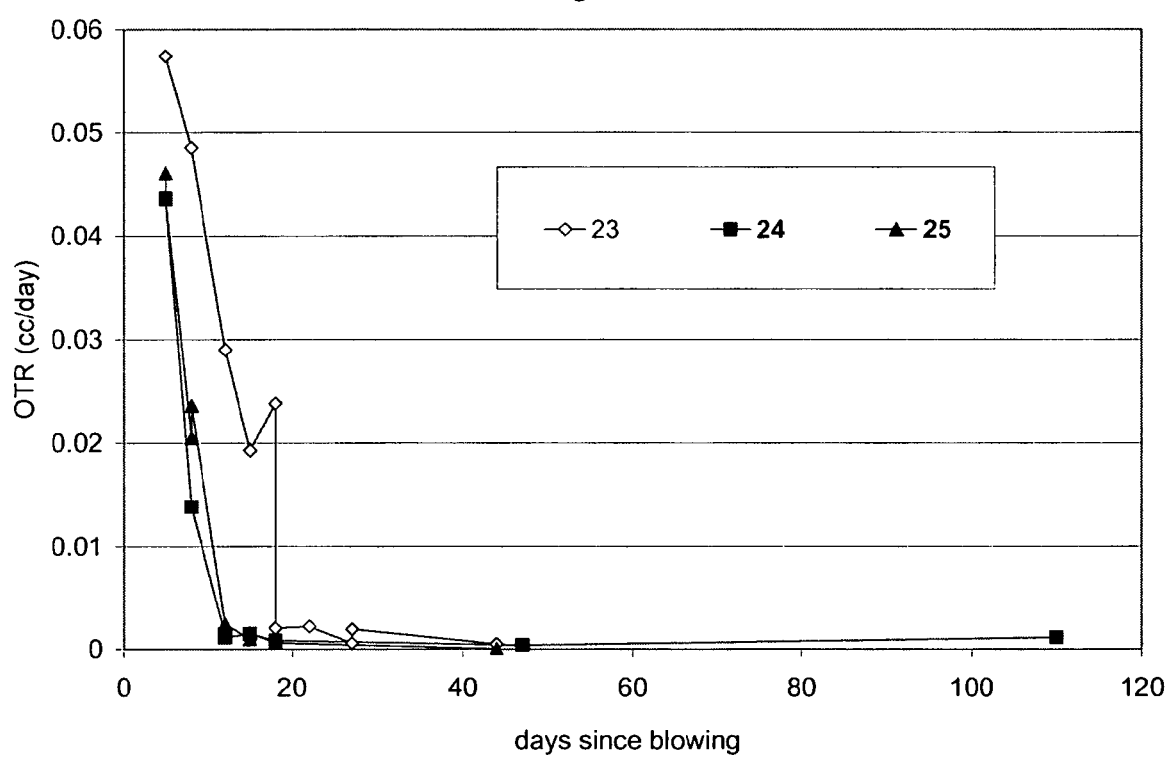
FIG. 7 is a graphical illustration of the oxygen transmission rate over time of bottles made from compositions of the invention compared to a resin composition in which the cobalt was added via a liquid concentrate

3 bottles of each set were mounted and purged with oxygen free gas the day following blowing. OTR's were monitored periodically. The results are set forth in Table 10 and graphically illustrated in FIG. 7.

TABLE 10

| Days since blowing | Sample 23 OTR (cc/day) | Bottle # | Sample 24 OTR (cc/day) | Bottle # | Sample 25 OTR (cc/day) | Bottle # |
|---|---|---|---|---|---|---|
| 5 | 0.0574 | 1 | 0.0437 | 1 | 0.0461 | 1 |
| 5 | — | — | — | — | 0.0435 | 2 |
| 8 | 0.0485 | 1 | 0.0138 | 1 | 0.0205 | 1 |
| 8 | — | — | — | — | 0.0236 | 2 |
| 12 | 0.0290 | 2 | 0.0015 | 2 | 0.0024 | 3 |
| 12 | — | — | 0.0011 | 3 | — | — |
| 15 | 0.0193 | 3 | 0.0015 | 1 | 0.0010 | 1 |
| 15 | — | — | — | — | 0.0016 | 2 |
| 18 | 0.0238 | 1 | 0.0008 | 2 | 0.0006 | 3 |
| 18 | 0.0020 | 2 | 0.0009 | 3 | — | — |

TABLE 10-continued

| Days since blowing | Sample 23 | | Sample 24 | | Sample 25 | |
|---|---|---|---|---|---|---|
| | OTR (cc/day) | Bottle # | OTR (cc/day) | Bottle # | OTR (cc/day) | Bottle # |
| 22 | 0.0022 | 3 | — | — | — | — |
| 27 | 0.0006 | 1 | — | — | — | — |
| 27 | 0.0020 | 2 | — | — | — | — |
| 44 | 0.0005 | 3 | — | — | 0.0001 | 3 |
| 47 | — | — | 0.0004 | 3 | — | — |
| 110 | — | — | 0.0012 | 1 | — | — |

The results demonstrate that cobalt added by way of a solid concentrate is at least as effective as cobalt added by way of a liquid carrier. In addition, clean up was much quicker with the samples prepared using solid concentrates, as the liquid carriers left a residue on the equipment used to blend and feed the pellets to the injection molding machine. This residue had to be physically removed so that it did not contaminate the machine for future use. This cleaning was time consuming. In contrast, any remaining pellets of the solid concentrates could be quickly removed by brushing or using compressed air to blow the solid concentrate off of the equipment. In addition, spills of liquid concentrate outside the blending and feed equipment presented the same clean up issues, while spills of the solid concentrate were again much easier to remove. Since spills and formulation changes are to be expected in a manufacturing operation, this represents a significant advantage for the solid concentrate.

Example 6

This example illustrates the effectiveness of solid concentrates at reducing haze relative to the addition of cobalt added by way of a liquid carrier. 25 gram preforms and 20 oz straightwall bottles were prepared from the compositions set forth in Table 11.

TABLE 11

| Sample | Bulk PET | Co Source | Co level (ppm) | PA-A wt % |
|---|---|---|---|---|
| 26 | Resin 12 | Conc 1 | 103 | 1.23 |
| 27 | Resin 4 | Conc 1 | 126 | 1.39 |
| 28 | Resin 5 | Conc 1 | 113 | 1.31 |
| 29 | Resin 5 | LIQ2 | 101 | 1.33 |

PA-A was added neat as a separate stream of pellets. The preforms were made by the following method:

The PA-A was used as received from an unopened bag without further drying while the bulk PET resin was dried in a separate system at 325 F. None of the cobalt Concentrates were dried. After drying but before injection molding, the PA-A, bulk PET, and Co Concentrate were physically blended using a ribbon mixer. The blend was fed into a drying hopper with a temperature set point of 325 F, located directly over the feed throat of the injection molding machine. Extruder and manifold temperatures were set at 536 F. Clear preforms were molded using a Husky LX160PET-P60/50-E42 and an 8 cavity, 25 gram preform mold with a 28 mm finish.

Straight wall, 20 oz., carbonated soft drink style containers were blow molded using a Sidel SBO 2/3 at an output rate of 1200 bottles/hour/mold. A water temperature setting of 50 F was used to chill the blow mold cavities. Blow mold processing conditions were adjusted to produce containers with equivalent distribution of material throughout the bottle for each Sample to be submitted for OTR testing. Material distribution was characterized by dividing the container into sections and weighing each section. Material distribution was also characterized by measuring the thickness of the container wall using a Hall effect sensor by Magna-Mike Model 8000. Oven power was the primary adjustment made to achieve equivalent material distribution for each Sample. Oven profile configuration and pre-blow timing were also adjusted in some instances.

Sidewalls were cut from these bottles and mounted on Mocon Oxtran 1000 instruments 3 days after blowing. On the instruments one side of the sidewall was swept with humidified oxygen free carrier gas and the other side was swept with humidified breathing quality air and the apparent sidewall permeability (the oxygen flux through the sidewall, times the average thickness of the sidewall, divided by the driving force for permeation) was monitored over time. Samples were maintained at 23° C.±1° C. for the duration of the test.

Figure 8:
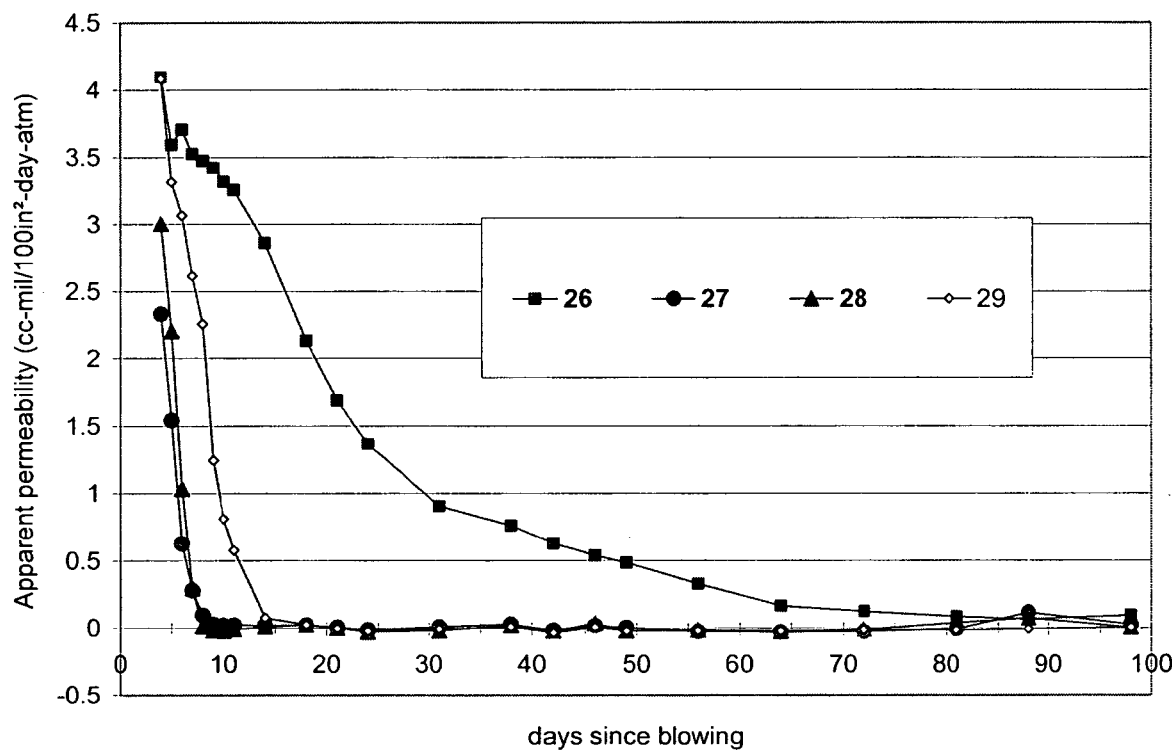
FIG. 8 is a graphical illustration of the oxygen transmission rate over time of bottles made from additional compositions of the invention compared to a resin composition in which the cobalt was added via a liquid concentrate

These results (in cc(STP) mil/100 in$^2$/day/atm) are presented in Table 12 and the results for days 4 through 98 days after blowing are graphically illustrated in FIG. 8. As can be seen from FIG. 8, all samples scavenged oxygen, as at time greater than about 5 days after blowing through the end of the test, the apparent oxygen permeability for all Samples is less than 4, which is the approximate value for PET sidewalls prepared under the same conditions.

TABLE 12

| | Apparent permeabilities (cc(STP)mil/100 in$^2$/day/atm) | | | |
|---|---|---|---|---|
| Days since blowing | Sample 26 | Sample 27 | Sample 28 | Sample 29 |
| 3 | 8.48 | 4.43 | 6.14 | 8.40 |
| 4 | 4.10 | 2.33 | 3.00 | 4.09 |
| 5 | 3.59 | 1.54 | 2.20 | 3.32 |
| 6 | 3.71 | 0.63 | 1.03 | 3.07 |
| 7 | 3.53 | 0.28 | 0.30 | 2.62 |
| 8 | 3.48 | 0.10 | 0.01 | 2.26 |
| 9 | 3.42 | 0.03 | −0.02 | 1.24 |
| 10 | 3.32 | 0.02 | −0.02 | 0.81 |
| 11 | 3.26 | 0.02 | −0.01 | 0.58 |
| 14 | 2.86 | 0.02 | 0.01 | 0.08 |
| 18 | 2.14 | 0.02 | 0.03 | 0.03 |
| 21 | 1.69 | 0.01 | 0.00 | 0.00 |
| 24 | 1.37 | −0.01 | −0.03 | −0.02 |
| 31 | 0.91 | 0.01 | −0.02 | −0.01 |
| 38 | 0.76 | 0.03 | 0.02 | 0.01 |
| 42 | 0.63 | −0.02 | −0.02 | −0.04 |
| 46 | 0.54 | 0.02 | 0.04 | 0.01 |
| 49 | 0.49 | 0.00 | −0.02 | −0.02 |
| 56 | 0.33 | −0.03 | −0.02 | −0.02 |
| 64 | 0.17 | −0.03 | −0.03 | −0.02 |
| 72 | 0.13 | −0.03 | −0.01 | −0.01 |
| 81 | 0.09 | −0.01 | 0.04 | −0.02 |
| 88 | 0.07 | 0.12 | 0.08 | −0.01 |
| 98 | 0.10 | 0.03 | 0.01 | 0.01 |

The haze levels for sidewalls of each sample were also measured according to ASTM D-1003 using a Gardner Haze meter. The haze result for Sample 26 was 2.6%; for Sample 27 was 2.8%, for Sample 28 was 3.65%, and for Sample 29 was 6.04%. Each of these values represents the average of three sidewalls. The sample containing the cobalt added by way of a liquid carrier has the highest haze at comparable cobalt and polyamide loadings, while preforms and bottles containing cobalt added by way of a solid concentrate have reduced haze levels.

Example 7

This example illustrates the effect of liquid carriers and solid concentrates on volatility and changes in viscosity. 48 gram preforms and 1 liter bottles were prepared using Resin 5 as the bulk PET, PA-A and four different cobalt sources: LIQ1, LIQ 2, Solid Concentrate 1 and Solid Concentrate 2. The preform compositions contained the amounts of cobalt and polyamide as set forth in Table 13.

TABLE 13

| Sample # | Co Source | Co level by X-ray (ppm) | PA-A |
|---|---|---|---|
| 30 | LIQ1 | 113 | 1.4 |
| 31 | LIQ2 | 135 | 1.4 |
| 32 | Solid 1 | 125 | 1.2 |
| 33 | Solid 2 | 116 | 1.3 |

LIQ1 was no longer free flowing at room temperature (~9 months after receipt.) In addition, when LIQ2 was added to the warm pellets of Resin 5 bulk PET and PA-A, considerable quantities of volatiles were generated that produced an objectionable odor. Changes in viscosity and generation of volatiles are both undesirable in a preform manufacturing operation. No such changes in viscosity or volatiles were noted with the solid Concentrates.

Preforms were made by the following procedure: The PA-A was dried at 150 F while the bulk PET resin was dried in a separate system at 325 F. None of the cobalt Concentrates were dried. After drying but before injection molding, the PA-A, bulk PET, and Co Concentrate were physically blended using a ribbon mixer. The blend was fed into a drying hopper with a temperature set point of 325 F, located directly over the feed throat of the injection molding machine. Extruder and manifold temperatures were set at 536 F. Clear preforms were molded using a Husky LX160PET-P60/50-E42 and a 4 cavity, 48 gram preform with a 43 mm finish.

One liter heatset containers were blow molded using a Sidel SBO 2/3-HR at an output rate 1000 bottles/hour/mold. An oil temperature setting of 257 F was used to heat the blow mold cavities. The water heating the mold base was set to a target temperature of 176 F. Blow mold processing conditions were adjusted to produce containers with equivalent distribution of material throughout the bottle for each Sample to be submitted for OTR testing. Material distribution was characterized by dividing the container into sections and weighing each section. Material distribution was also characterized by measuring the thickness of the container wall using a Hall effect sensor by Magna-Mike Model 8000. Oven power was the primary adjustment made to achieve equivalent material distribution for each Sample. Oven profile configuration and pre-blow timing were also adjusted in some instances.

Figure 9:
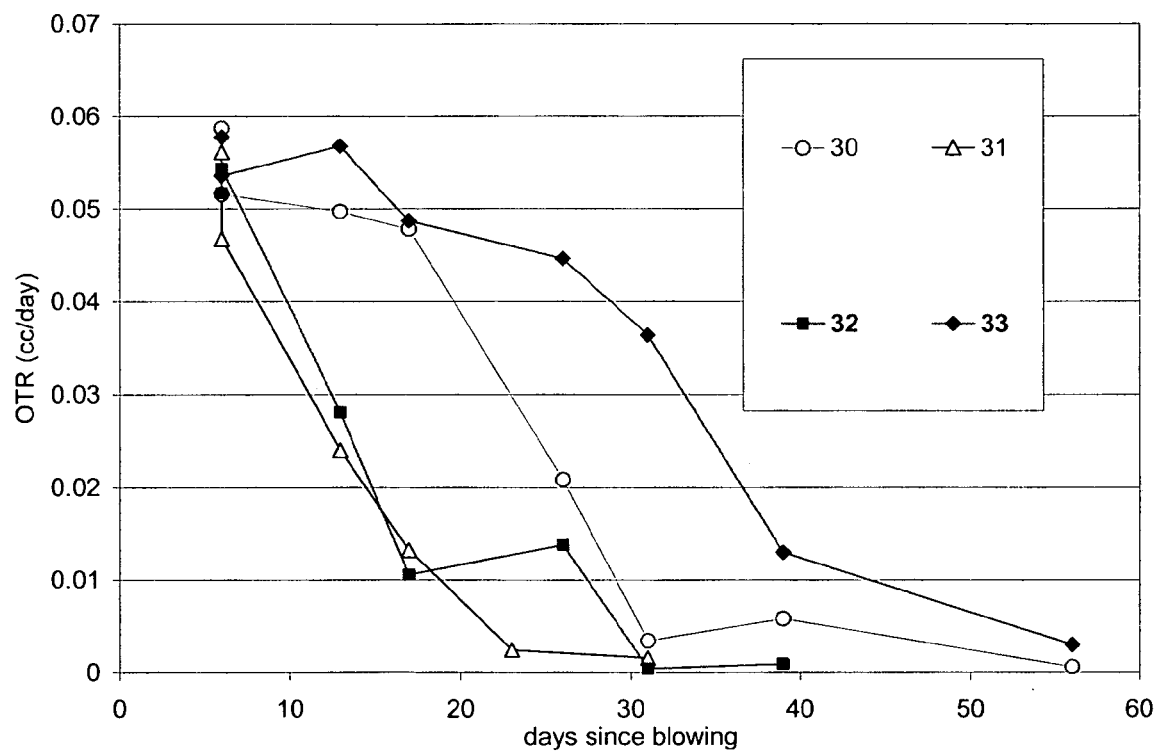
FIG. 9 is a graphical illustration of the oxygen transmission rate over time of additional bottles made from compositions of the invention compared to resin compositions in which the cobalt was via liquid concentrates

Bottles stretch blow molded from the preforms were mounted and purged with oxygen free gas 1 day after blowing and OTR's were measured periodically. Results are set forth in Table 14 and graphically illustrate in FIG. 9. The results show that all samples scavenged oxygen at acceptable rates.

TABLE 14

| Days since blowing | Sample 30 OTR (cc/day) | bottle # | Sample 31 OTR (cc/day) | bottle # | Sample 32 OTR (cc/day) | bottle # | Sample 33 OTR (cc/day) | bottle # |
|---|---|---|---|---|---|---|---|---|
| 6 | 0.0587 | 1 | 0.0561 | 1 | 0.0517 | 1 | 0.0578 | 3 |
| 6 | 0.0516 | 2 | 0.0468 | 2 | 0.0544 | 3 | 0.0536 | 1 |
| 13 | 0.0497 | 3 | 0.0240 | 3 | 0.0281 | 2 | 0.0568 | 2 |
| 17 | 0.0478 | 1 | 0.0132 | 1 | 0.0106 | 1 | 0.0487 | 1 |
| 23 | — | — | 0.0025 | 2 | — | — | — | — |
| 26 | 0.0208 | 2 | — | — | 0.0138 | 3 | 0.0446 | 3 |
| 31 | 0.0034 | 3 | 0.0016 | 3 | 0.0005 | 2 | 0.0364 | 2 |
| 39 | 0.0058 | 1 | — | — | 0.0009 | 1 | 0.0130 | 1 |
| 56 | 0.0006 | 2 | — | — | — | — | 0.0030 | 3 |

Example 8

This example illustrates the superior color properties in b*, L*, and Yellowness Index (YI) in bottles made with concentrates relative to bottles made with liquid carriers. This example also demonstrates the superior color property in b* and YI in bottles made from concentrates which are co-dried relative to bottles made with liquid concentrates in which the polyamide and polyester particles are individually dried.

25.6 gram preforms were produced on a BOY 22S injection molding machine using a single preform cavity mold. In all samples, Resin 5 pellets, PA-A pellets, and a cobalt source were fed to the injection molding machine in the measured amounts and by the type of cobalt source as shown in Table 15. Samples 34 through 43 were mixed after drying the polyamide and PET resin and prior to addition to the hopper of the BOY 22S. Samples 44 and 45 were mixed prior to drying.

TABLE 15

| Sample # | Co Source | Metals by X-ray (ppm) | | | | | | HNMR PA-A wt %: |
| --- | --- | --- | --- | --- | --- | --- | --- | --- |
| | | Zn: | Co: | Mn: | Ti: | Sb: | P: | |
| 34 | Solid Conc 1 | 57 | 43 | 1 | 1 | 221 | 72 | 1.39 |
| 35 | Solid Conc 1 | 57 | 95 | 1 | 1 | 223 | 76 | 1.24 |
| 36 | Solid Conc 1 | 57 | 186 | 3 | 1 | 221 | 79 | 1.38 |
| 37 | Solid Conc 2 | 58 | 46 | 0 | 0 | 224 | 72 | 1.01 |
| 38 | Solid Conc 2 | 59 | 91 | −1 | 0 | 225 | 72 | 1.43 |
| 39 | Solid Conc 2 | 59 | 172 | 0 | 0 | 220 | 73 | 1.42 |
| 40 | LIQ2 | 58 | 47 | −1 | 0 | 220 | 72 | 1.55 |
| 41 | LIQ2 | 59 | 103 | −1 | 0 | 221 | 72 | 1.55 |
| 42 | LIQ2 | 59 | 108 | 0 | 0 | 220 | 71 | 1.43 |
| 43 | LIQ2 | 58 | 204 | 0 | 0 | 220 | 72 | 1.72 |
| 44* | Solid Conc 1 | 56 | 103 | 1 | 0 | 222 | 76 | 1.30 |
| 45* | Solid Conc 2 | 58 | 89 | −1 | 0 | 222 | 74 | 1.29 |

*all components dried at PET conditions prior to molding, components dried separately for other samples.

The preforms and bottles were made by the following procedure:

For the samples that were prepared without codrying, the PA-A was dried at 60° C. while the bulk PET resin was dried in a separate system at 168° C. and the cobalt concentrates were not dried. After drying, but before injection molding, the PA-A, bulk PET, and Co Concentrate were physically paddle blended by hand. The mixture was fed into a hopper, located directly over the feed throat of the injection molding machine. Extruder and manifold temperatures were set at 270 C. Clear preforms were molded using a BOY Model 22D and a 1 cavity, 25.6 gram preform with a 28 mm finish.

For the samples that were codried prior to injection molding, the PA-A, PET and solid cobalt Concentrates were mixed same as above and then dried at 168° C. for 8 hrs. Following drying, the mixture was fed into a hopper, located directly over the feed throat of the BOY Model 22D injection molding machine and preforms were produced as described above.

Color measurements for the preforms were taken and the results are reported in Table 16.

TABLE 16

| Sample # | Sample description | Avg. L*: | Avg. a*: | Avg. b* | Avg. YI: | Avg. WI: |
| --- | --- | --- | --- | --- | --- | --- |
| | Co @50 ppm | | | | | |
| 34 | Solid Conc 1 | 72.03 | −1.08 | −1.62 | −5.04 | 52.94 |
| 37 | Solid Conc 2 | 73.27 | −1.28 | −0.97 | −3.60 | 51.09 |
| 40 | LIQ2 | 71.26 | −1.38 | 1.64 | 2.64 | 33.06 |
| | Co @100 ppm | | | | | |
| 35 | Solid Conc 1 | 68.61 | −0.87 | −3.73 | −10.63 | 61.04 |
| 38 | Solid Conc 2 | 70.58 | −1.17 | −2.34 | −7.06 | 55.18 |
| 41, 42 (Avg.) | LIQ2 | 66.02 | −0.42 | 2.99 | 7.23 | 16.94 |
| | Co @200 ppm | | | | | |
| 36 | Solid Conc 1 | 65.37 | 0.71 | −7.74 | −20.84 | 82.06 |
| 39 | Solid Conc 2 | 64.71 | 0.15 | −5.78 | −15.95 | 69.72 |
| 43 | LIQ2 | 53.17 | 1.50 | 5.33 | 17.69 | −17.41 |

TABLE 16-continued

| Sample # | Sample description | Avg. L*: | Avg. a*: | Avg. b* | Avg. YI: | Avg. WI: |
| --- | --- | --- | --- | --- | --- | --- |
| | Codried (Co @ 100 ppm) | | | | | |
| 44 | Solid Conc 1 | 69.04 | −1.18 | −0.14 | −1.56 | 40.25 |
| 45 | Solid Conc 2 Control | 69.28 | −1.31 | −1.01 | −3.92 | 45.79 |
| NA | No Conc, PA | 79.36 | −1.03 | 3.00 | 5.70 | 39.65 |

The results indicate that the preforms made with solid concentrates exhibit better color than preforms made with liquid carriers at equivalent loadings of cobalt, as shown by the lower b*, lower YI, and higher L* values of the preforms made with concentrates. Compare Samples 34–39 with Samples 40–43.

A comparison of Samples 44 and 45 against 41 and 42 indicates that the color of preforms in which all components were "codried" (dried together prior to injection molding), had better visual appearance and color values than preforms in which the pellets streams were individually dried and cobalt was added as a liquid concentrate at similar cobalt and polyamide loadings.

Preforms corresponding to Samples 35, 38, 44 and 45 were ground through a 3 mm screen and 1 gram samples were loaded into 20 ml prescored glass ampoules (Wheaton #176782) containing an OxyDot (OxySense Inc., 1311 North Central Expressway Suite 44, Dallas, Tex. 75243, USA) glued on the side of the ampoule with silicon adhesive. Two such ampoules were prepared for each Sample tested. These ampoules were then sealed and placed in an oven maintained at 75° C. The partial pressure of oxygen in each of the ampoules (PO2) was then monitored periodically using an OxySense instrument (OxySense Inc.) to assess the oxygen scavenging performance of the compositions. The results are graphically illustrated in FIG. 10.

Figure 10:
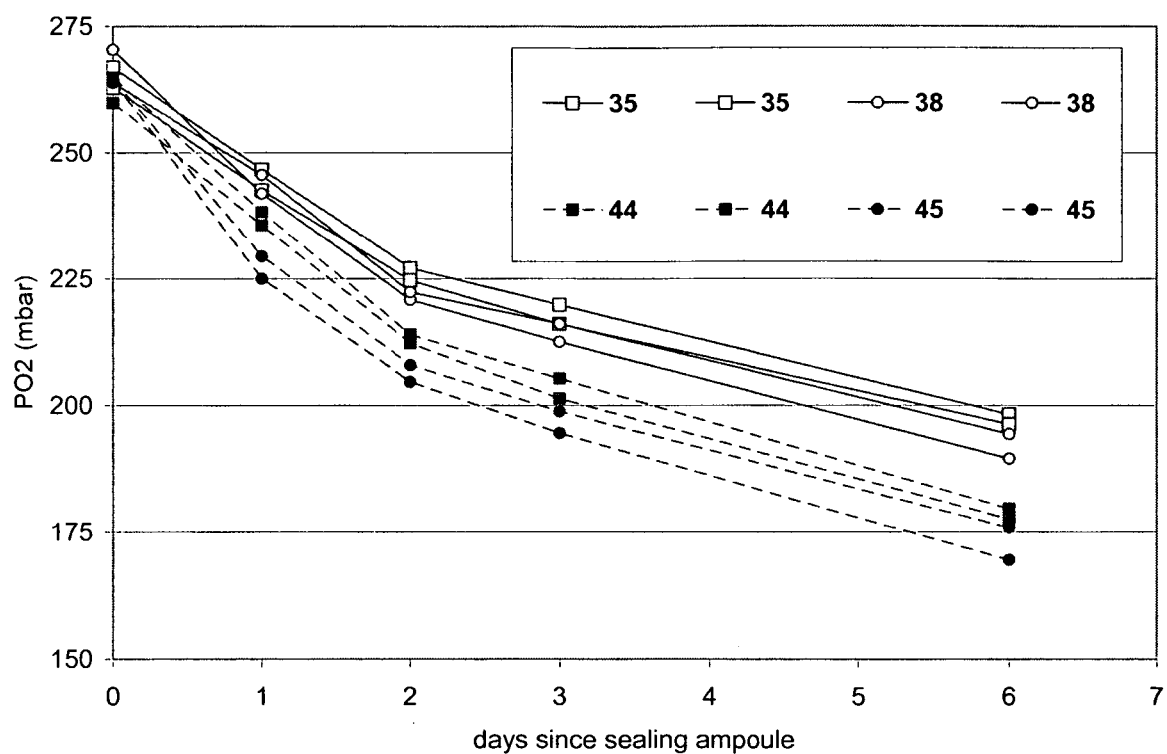
FIG. 10 is a graphical illustration of the oxygen partial pressure over time in sealed ampoules containing compositions of the invention in which the compononets of the blend were "Codried" compared to similar compositions in which the components were not dried together prior to the injection molding step

As shown in FIG. 10, the codrying process surprisingly improves the scavenging performance of the Samples as indicated by the lower PO2 for the codried samples in this OxySense test.

Thus, codrying the bulk PET, polyamide pellets, and the concentrates improved the oxygen scavenging characteristics of the preforms while maintaining better color in terms of b* color, L* color, YI than the samples prepared with a liquid concentrate.

Example 9

LIQ2 was stored for approximately 12 weeks at laboratory conditions. Gradations in consistency of the dispersion were evident. Changes in consistency over time, whether due to settling of the cobalt salt or other causes, would complicate manufacturing procedures using the dispersion. No such variations were noted after storage of polyester based Solid Concentrates 1 and 2.

Example 10

This example demonstrates the improved capability of compounding high levels of cobalt into polymers of increasing cyclohexane dimethanol (CHDM) levels. This example demonstrates that the metal loading can be raised in a commercial manufacturing scaleable process.

Different levels of cobalt neodecanoate were melt blended into polyester polymers or polymer mixtures of increasing levels of CHDM in a pilot scale 57 mm twin-screw extruder according to the attached table. Separate feeds of polyester polymer resin and resin mixtures and cobalt neodecanoate, in the form of a pastel and supplied as Cobalt Ten-Cem 22.5% from OMG (22.5% of the Cobalt Ten-Cem represents the amount by weight of cobalt), were fed into a twin-screw and melt blended at a set point of approximately 235° C. Molten polymer exited the extruder in the form of approximate 0.08" diameter strands which are water quenched and cut into approximate 0.125" length pellets. 50–200 lbs of each composition were extruded and qualitative judgments were made about the ability to strand and cut each material. Polyester polymer resins with the higher amount of CHDM modification processed the best at the higher loadings of cobalt neodecanoate. The reported amounts are based on the weight of the compound. The weight of the cobalt content can be calculated by multiplying the cobalt neodecanoate compound weight by 0.225.

Sample 46: 97.78% Polyester Polymer Resin 3; 2.22 wt. % cobalt neodecanoate; CHDM content of the polyester=3.5 mole %

Results: brittle strands, a few "sticks" as strands shattered in the cutter. Sticks are referred to herein as strands which were cut into pieces longer than the typical ⅛" pellet.

Sample 47: 96.33% Polyester Polymer Resin 3; 3.67 wt. % cobalt neodecanoate; CHDM content of the polyester=3.5 mole %

Results: brittle strands, lots of "sticks"

Sample 48: 96.33% Polyester Polymer Resin 13; 3.67% cobalt neodecanoate; CHDM content of the polyester=4.5 mole %

Results: brittle strands, lots of "sticks", slightly better than Sample 47

Sample 49: 70.40% Polyester Polymer Resin 13 and 27.38% Polyester Polymer Resin 14; 2.22 wt. % cobalt neodecanoate; CHDM content of the resulting polyester=11 mole %

Results: brittle strands, "sticks"

Sample 50: 70.40% Polyester Polymer Resin 3 and 27.38% Polyester Polymer Resin 14; 2.22 wt. % cobalt neodecanoate; % CHDM content of the resulting polyester=11 mole %

Results: brittle strands, "sticks"

Sample 51: f 69.36% Polyester Polymer Resin 3 and 26.97% Polyester Polymer Resin 14; 3.67 wt. % cobalt neodecanoate; CHDM content of the resulting polyester=11 mole %

Results: brittle strands, "sticks"

Sample 52: 96.33% Polyester Polymer Resin 14; 3.67 wt. % cobalt neodecanoate; CHDM content of the polyester=31 mole %

Results: not as brittle, no sticks, ran better

Sample 53: production of 4300 lbs of 96.33% Polyester Polymer Resin 15 (31 mole % CHDM) containing 3.67 wt. % cobalt neodecanoate on a 92 mm twin-screw extruder.

Results: ran well enough to qualify for high volume commercial scale production runs, with few sticks present.

What we claim is:

1. A process for the manufacture of a preform comprising combining:
   solid polyester particles comprising a polyester polymer,
   solid polyamide particles comprising a polyamide polymer, and
   solid concentrate particles obtained by melt compounding a transition metal compound in an amount ranging from 1000 ppm to 10,000 ppm (by metal) and a polyester polymer having an It.V. of 0.55 dL/g to 1.15 dL/g in an amount of at least 40 wt. %, each based on the weight of the concentrate, wherein the transition metal is provided in an oxidation state other than zero into a melt processing zone, forming a melt, and forming a preform directly from the melt.

2. The process of claim 1, wherein the preform is a bottle preform.

3. The process of claim 1, wherein the polyester polymer in the polyester particles or contained in the concentrate comprises:
   (i) a polycarboxylic acid component comprising at least 92.0 mole % residues of terephthalic acid, or derivates of terephthalic acid, or mixtures thereof, and
   (ii) a hydroxyl component comprising at least 40.0 mole % residues of ethylene glycol,
based on 100 mole percent of the polycarboxylic acid component residues and 100 mole percent hydroxyl component residues in the polyester polymer, respectively.

4. The process of claim 1, wherein the transition metal comprises cobalt present in an amount ranging from 1,000–10,000 ppm based on the weight of the concentrate.

5. The process of claim 1, wherein the amount of polyester polymer present in the concentrate is at least 98 wt. %, based on the weight of the polymers in the concentrate.

6. The process of claim 1, wherein the concentrate is free of polymers other than the polyester polymer.

7. The process of claim 4, wherein the source of cobalt comprises a cobalt carboxylate or cobalt neodecanoate, or mixtures therof.

8. The process of claim 1, wherein the It.V. of the polyester polymers in both the polyester polymer particles and added to prepare the concentrate are 0.70 dL/g.

9. The process of claim 8, wherein the It.V. of the polyester polymers in the polyester polymer particles is at least 0.70 dL/g obtained in a melt phase polymerization process.

10. The process of claim 9, wherein said It.V. is at least 0.76 dL/g.

11. The process of claim 1, wherein the It.V. of the solid polyester polymer particles as and the It.V. of the polyester polymers used to prepare the concentrate are each at least 0.70 dL/g obtained in a melt phase polymerization process.

12. The process of claim 1, wherein neither the solid polyester polymer particles nor the polyester polymers used to prepare the concentrate are solid state polymerized.

13. The process of claim 1, wherein at least a portion of the polyester polymer in the polyester polymer particles is different from at least a portion of the polyester polymers present in the concentrate.

14. The process of claim 1, wherein the preform comprises a bottle preform having a composition comprising from 1 to 5 wt. % of an oxidizable polymer or an oxygen scavenging polymer, 30 to 300 ppm cobalt, and polyester polymers present in an amount of at least 90 wt. %, each based on the weight of the preform.

15. The process of claim 1, wherein the oxidizable polymer comprises a polyamide polymer having repeating units with a benzylic hydrogen atom.

16. The process of claim 15, wherein the polyamide polymer is obtained from a reactant containing a xylylene moiety.

17. The process of claim 1, wherein the polyester polymer particles, the concentrate particles, and the polyamide polymer particles are combined into the melt processing zone as individual streams or as particle/particle dry blends, or as combinations therof.

18. The process of claim 1, wherein the polyester polymer contained in the concentrate comprises:
(i) a polycarboxylic acid component comprising at least 80.0 mole % residues of terephthalic acid, or derivates of terephthalic acid, or mixtures thereof, and
(ii) a hydroxyl component comprising at least 40.0 mole % residues of ethylene glycol and from 25 mole % to 60 mole % of a hydroxyl modifier compound,
based on 100 mole percent of the polycarboxylic acid component residues and 100 mole percent hydroxyl component residues in the polyester polymer, respectively.

19. The process of claim 1, wherein the preform further comprises zinc.

20. The process of claim 1, wherein the concentrate contains a higher concentration of the transition metal than present in the preform.

21. The process of claim 1, wherein the let down ratio of the transition metal concentration in the concentrate to the transition metal concentration in the preform composition ranges from 30:1 to 100:1.

22. The process of claim 1, wherein the polyester polymer contained in the concentrate is modified with a hydroxyl modifier in an amount of at least 30 mole % and up to 60 mole % based on all moles of hydroxyl components.

23. The process of claim 1, wherein the transition metal compound comprises a carboxylate, oxide, borate, carbonate, chloride, dioxide, hydroxide, nitrate, phosphate, sulfate, or silicate, or mixtures therof.

24. The process of claim 4 wherein at least a portion of the cobalt is present in the +2 or +3 oxidation state.

25. The process of claim 1, wherein the concentrate is essentially free of a polyamide polymer.

26. The process of claim 1 wherein the solid concentrate particles comprise the transition metal present in an amount greater than 1,500 ppm based on the weight of the concentrate.

27. The process of claim 1, wherein the solid concentrate particles comprise the transition metal present in an amount less than 8,000 ppm.

28. The process of claim 1, wherein the perform comprises the transition metal present in an amount ranging from 30 ppm to 500 ppm based on the weight of the preform.

29. The process of claim 1, wherein the preform comprises the transition metal present in an amount ranging from 50 ppm to 300 ppm based on the weight of the preform.

30. The process of claim 1, wherein the transition metal comprises cobalt, copper, rhodium, platinum, rhenium, ruthenium, palladium, tungsten, osmium, cadmium, silver, tantalum, hafnium, vanadium, titanium, chromium, nickel, zinc, or manganese.

31. The process of claim 23, wherein the carboxylate comprises neodecanoates, octanoates, acetates, lactates, naphthalates, malates, stearates, acetylacetonates, linoleates, oleates, palmitates, 2-ethylhexanoates, or ethylene glycolates.

32. The process of claim 1, wherein the transition metal comprises cobalt neodecanoate or cobalt acetate present in an amount ranging from 2,000 ppm to 8,000 ppm based on the weight of the concentrate.

33. The process of claim 1 wherein the polyester polymer in the polyester particles or contained in the concentrate comprises repeating units of terephthalic acid residues, isophthalic acid residues, naphthalienic acid residues, or mixtures thereof.

34. The process of claim 1, wherein the polyester polymer used to prepare the concentrate particles has an lt.V. of at least 0.65 dL/g.

35. The process of claim 1, wherein the polyester polymer used to prepare the concentrate particles has an lt.V. of at least 0.75 dL/g.

36. The process of claim 1, wherein the concentrate particles have an lt.V. ranging from 0.60 dL/g to 1.15 dL/g.

37. The process of claim 36, wherein the concentrate particles have an lt.V. of at least 0.70 dL/g.

38. The process of claim 36, wherein the concentrate particles have an lt.V. of at least 0.75 dL/g.

39. The process of claim 1, wherein the polyester polymer contained in the concentrate is semicrystalline.

40. The process of claim 1, wherein the polyester polymer contained in the concentrate is essentially amorphous and has a DSC Tg of at least 70 °C.

41. The process of claim 19, wherein the zinc is present in the range of 50 ppm to 300 ppm.

42. The process of claim 19, wherein the zinc is present in the range of 50 ppm to 150 ppm.

43. The process of claim 1, wherein the let down ratio of the transition metal concentration in the concentrate to the transition metal concentration in the preform ranges from 30:1 to 200:1.

44. The process of claim 1, wherein the polyamide polymer has a number average molecular weight Mn of 1,000 to 45,000.

45. The process of claim 44, wherein the polyamide polymer has a number average molecular weight Mn of at least 3.500.

46. The process of claim 44, wherein the polyamide polymer has a number average molecular weight Mn of less than 15,000.

47. The process of claim 1, further comprising combining an additive comprising a colorant, acetaldehyde scavenger, reheat agent, UV absorber or inhibitor, stabilizer, thermal stabilizer, or mixtures thereof.

48. The process of claim 1, further comprising forming a bottle from the perform, wherein the perform comprises 150 ppm or less of cobalt based upon the weight of the preform, and wherein the bottle has a sidewall haze of 4.0% or less.

49. The process of claim 1, further comprising forming a bottle from the perform, wherein the perform comprises 150 ppm or less of cobalt based upon the weight of the preform, and wherein the bottle has a sidewall haze of 3.5% or less.

50. The process of claim 9, wherein said lt.V. is at least 0.80 dL/g.

51. The process of claim 1, wherein the preform comprises a bottle preform having a composition comprising from 1 to 5 wt.% of an oxidizable polymer or an oxygen scavenging polymer, 50 to 200 ppm cobalt, and polyester polymer present in an amount of at least 90 wt.%, each based on the weight of the preform.

52. The process of claim 1, wherein the preform comprises a bottle preform having a composition comprising from 1 to 10 wt.% of an oxidizable polymer or an oxygen scavenging polymer, 30 to 300 ppm cobalt, and polyester polymers present in an amount of at least 90 wt.%, each based on the weight of the preform.

53. The process of claim 1, wherein the preform comprises a bottle preform having a composition comprising from 1 to 10 wt.% of an oxidizable polymer or an oxygen scavenging polymer, 50 to 200 ppm cobalt, and polyester polymers present in an amount of at least 90 wt.%, each based on the weight of the preform.

54. The process of claim 3, wherein the hydroxyl component comprises residues of butanediol, 1,4-cyclohexane dimethanol, 2,4-dihydroxy-1, 1, 3, 3-tetramethyl-cyclobutane, trimethylene glycol, neopentyl glycol, or diethylene glycol.

55. The process of claim 3, wherein the hydroxyl component comprises residues of a hydroxyl compound modifier present in an amount up to 50 mole %.

56. The process of claim 3, wherein the hydroxyl component comprises residues of a hydroxyl compound modifier present in an amount up to 15 mole %.

57. The process of claim 3, wherein the hydroxyl component comprises residues of a hydroxyl compound modifier present in an amount up to 8 mole %.

58. The process of claim 18, wherein the hydroxyl modifier compound is present in an amount of at least 30 mole %.

59. The process of claim 18, wherein the hydroxyl modifier compound comprises residues of butanediol, 1, 4-cyclohexane dimethanol, 2, 4-dihydroxy-1, 1, 3, 3-tetramethyl-cyclobutane, trimethylene glycol, neopentyl glycol, or diethylene glycol.

60. The process of claim 18, wherein the hydroxyl modifier compound comprises residues of 1,4-cyclohexane dimethanol.

* * * * *

UNITED STATES PATENT AND TRADEMARK OFFICE
CERTIFICATE OF CORRECTION

PATENT NO. : 7,288,586 B2 Page 1 of 1
APPLICATION NO. : 11/292441
DATED : October 30, 2007
INVENTOR(S) : Stewart et al.

It is certified that error appears in the above-identified patent and that said Letters Patent is hereby corrected as shown below:

Correction(s)

Column 34, line 32, "or" before "cobalt" should be deleted

Column 34, line 36, "concentrate are 0.70 dL/g" should read:
--concentrate are 0.70 dL/g to 1.15 dL/g--

Column 35, line 2, "or" before "as particle/particle" should be deleted

Column 35, line 33, "or" before "silicate" should be deleted

Column 36, line 35, "3.500" should read: --3,500--

Signed and Sealed this

Eighth Day of April, 2008

JON W. DUDAS
*Director of the United States Patent and Trademark Office*